(12) United States Patent
Maruyama et al.

(10) Patent No.: US 7,677,127 B2
(45) Date of Patent: Mar. 16, 2010

(54) ROTATION TRANSMISSION MEMBER, ROTATION TRANSMISSION ASSEMBLY, AND GEAR MECHANISM

(75) Inventors: Tsuneo Maruyama, Niigata (JP); Yuji Aoki, Niigata (JP); Teruo Shimizu, Niigata (JP)

(73) Assignee: Diamet Corporation, Nigata-Ken (JP)

( * ) Notice: Subject to any disclaimer, the term of this patent is extended or adjusted under 35 U.S.C. 154(b) by 1399 days.

(21) Appl. No.: 10/525,287

(22) PCT Filed: Aug. 19, 2003

(86) PCT No.: PCT/JP03/10452

§ 371 (c)(1),
(2), (4) Date: Feb. 16, 2005

(87) PCT Pub. No.: WO2004/016961

PCT Pub. Date: Feb. 26, 2004

(65) Prior Publication Data

US 2005/0255960 A1    Nov. 17, 2005

(30) Foreign Application Priority Data

Aug. 19, 2002    (JP) .............................. 2002-238119
Aug. 19, 2002    (JP) .............................. 2002-238120
Aug. 19, 2002    (JP) .............................. 2002-238121

(51) Int. Cl.
*F16H 55/17*    (2006.01)
*F16D 1/06*    (2006.01)

(52) U.S. Cl. ...................... 74/434; 403/280; 403/282; 403/359.6

(58) Field of Classification Search ................ 403/279, 403/280, 282, 359.2, 359.4, 359.6; 29/432, 29/525, 893.2; 74/434
See application file for complete search history.

(56) References Cited

U.S. PATENT DOCUMENTS 3,100,333 A    8/1963    Friend (Continued)

FOREIGN PATENT DOCUMENTS

EP    1 179 440 A2    2/2002

(Continued)

OTHER PUBLICATIONS

International Search Report for PCT/JP03/10452 mailed on Dec. 2, 2003.

*Primary Examiner*—William C Joyce
(74) *Attorney, Agent, or Firm*—Darby & Darby P.C.

(57) ABSTRACT

There is provided a rotation transmission assembly that can be produced in large quantities and at low cost and has an anti-rotation function and an anti-release function. This rotation transmission assembly has a rotation transmission member formed in a substantially circular plate configuration, in a center of which there is a substantially circular cylinder shaped through hole that is formed by an inner circumferential surface, and that includes a rotation transmission portion located on an outer circumferential portion of the rotation transmission member; and an inner side member that is press-inserted into the through hole, wherein the inner circumferential surface of the rotation transmission member is provided with: a smooth ring-shaped surface that is placed adjacent to one end of the inner circumferential surface; and a plurality of protrusion shaped portions that, taking the ring-shaped surface as a basis, protrude inwards in the radial direction, and extend along a portion of the length in the axial direction of the through hole, and wherein the inner side member and the rotation transmission member mesh with each other within the range in which the protrusion shaped portions extend, and are in surface contact with each other within a range in which the ring-shaped surface extends.

5 Claims, 14 Drawing Sheets

U.S. PATENT DOCUMENTS

| | | | |
|---|---|---|---|
| 3,290,918 A * | 12/1966 | Weasler | 72/340 |
| 4,827,800 A | 5/1989 | Pedersen et al. | |
| 5,716,156 A * | 2/1998 | Bayer et al. | 403/282 |
| 5,855,444 A * | 1/1999 | Ohlson et al. | 403/13 |
| 6,553,868 B2 * | 4/2003 | Takenaka et al. | 74/665 B |
| 2002/0025093 A1 | 2/2002 | Sahashi et al. | |

FOREIGN PATENT DOCUMENTS

| | | | |
|---|---|---|---|
| FR | 2580341 | * | 10/1986 |
| JP | 59-101501 A | | 6/1984 |
| JP | 59-140911 A | | 8/1984 |
| JP | 8-4717 A | | 1/1996 |
| JP | 8-178020 A | | 7/1996 |
| JP | 9-158952 A | | 6/1997 |
| JP | 2000-283264 | * | 10/2000 |
| JP | 2001-354004 A | | 12/2001 |
| KR | 1998-052506 | | 7/1999 |

* cited by examiner

PRESS-INSERTION
DIRECTION
→

ROTATION TRANSMISSION MEMBER, ROTATION TRANSMISSION ASSEMBLY, AND GEAR MECHANISM

CROSS-REFERENCE TO PRIOR APPLICATION

This is a U.S. National Phase application under 35 U.S.C. §371 of International Patent Application No. PCT/JP2003/010452 filed Aug. 19, 2003, and claims the benefit of Japanese Patent Application Nos. 2002-238119 filed Aug. 19, 2002; 2002-238120 filed Aug. 19, 2002 and 2002-238121 filed on Aug. 19, 2002 all of which are incorporated by reference herein. The International Application was published in Japanese on Feb. 26, 2004 as WO 2004/016961 A1 under PCT Article 21(2).

TECHNICAL FIELD

The present invention relates to a rotation transmission member such as a gear or the like, a rotation transmission assembly, and a gear mechanism that transmit a rotational motion to each other using a rotation transmission portion that is provided at an outer circumferential portion.

BACKGROUND ART OF THE INVENTION

Conventionally, as is the case with planetary gears in a planetary gear mechanism that is used in a deceleration mechanism, components that are formed by a rotation transmission member such as a gear member or the like and a columnar shaped member such as a bearing or the like are fixed by a device such as a key slot, a spline, a knurl, or by pressure insertion or the like such that the two members are not rotated relative to each other by rotation force.

However, because a configuration such as a key slot and spline needs to be formed in both an inner circumferential surface and an outer circumferential surface of each member, the problem arises in that manufacturing costs are high. Moreover, in the case of a key slot, it is necessary to separately manufacture the three key members and then assemble these members so that the problem arises that assembly costs are further accumulated.

In addition, because an anti-release function cannot be obtained from simple pressure insertion, key slots, splines, and flat knurls, they cannot be used in rotation transmission members that receive force in the thrust direction. Furthermore, zigzag knurls that do have an anti-release function have a configuration that cannot be formed by normal powder press-molding. Because powder metallurgical production cannot be employed, zigzag knurls are not suitable for bearings and gears that are demanded in large volume production and at low cost.

DISCLOSURE OF INVENTION

The present invention was conceived in view of the above problems, and it is an object thereof to provide a rotation transmission member, a rotation transmission assembly, and a gear mechanism that can be produced in large quantity and at low cost, and that have an anti-rotation function and an anti-release function.

In order to solve the above described problems, the present invention provides a rotation transmission member that is provided with: a substantially ring-shaped rotation transmission portion; and a supporting portion that is placed on an inner side of the rotation transmission portion and has a substantially circular cylinder shaped through hole that is formed by an inner circumferential surface thereof, and that supports the rotation transmission portion. In this rotation transmission member, the inner circumferential surface is provided with: a smooth ring-shaped surface that is placed adjacent to one end of the inner circumferential surface; and a plurality of protrusion-shaped portions that, taking the ring-shaped surface as a basis, protrude inwards in the radial direction, and extend along a portion of the length in the axial direction of the through hole.

This rotation transmission member is used by an inner side member of a bearing member or the like being press-inserted into the through hole in the rotation transmission member. In this case, in addition to the inner side member being fixed by being press-inserted in the through hole in the rotation transmission member, the inner side member is fixed even more firmly to the rotation transmission member by the protrusion-shaped portions biting into the outer circumferential surface of the inner side member. Accordingly, a compact engagement between the rotation transmission member and the inner side member can be achieved, and the rotation transmission member and the inner side member can be made to rotate together without any slippage occurring.

In addition, as a result of the protrusion-shaped portions, which are formed so as to occupy a portion in the axial direction of the inner circumferential surface, biting into the outer circumferential surface of the press-inserted inner side member, the front end surfaces in the press-insertion direction of the protrusion-shaped portions abut against the inner side member and restrict movement of the inner side member in the press-insertion direction, enabling displacement in the axial direction of the inner side member to be prevented.

Furthermore, because the inner circumferential surface is provided with a smooth ring-shaped surface that is placed adjacent to one end of the inner circumferential surface, and with a plurality of protrusion-shaped portions that, taking the ring-shaped surface as a basis, protrude inwards in the radial direction, and extend along a portion of the length in the axial direction of the through hole, by inserting the inner side member in the ring-shaped surface, the inner side member is press-inserted with the ring-shaped surface used as a guide. Therefore, it is possible to prevent the shaft from tilting during assembly, and the shaft of the inner side member can be easily kept parallel with the rotation transmission member.

Moreover, by inserting the inner side member from the ring-shaped surface towards the protrusion-shaped portions, the inner side member is press-inserted such that the protrusion-shaped portions press into the outer circumferential surface of the inner side member which is in a compressed state around the entire surface of the inner side. Therefore, the inner side member can be uniformly compressed and engaged by press-insertion.

In addition, this rotation transmission member can be easily manufactured by powder molding and sintering. In this case, the rotation transmission portion and the supporting portion are formed integrally. Namely, when the rotation transmission member is manufactured by powder press molding, groove configurations that are used to form the protrusion-shaped portions can be easily provided by cutting or grinding on an outer circumferential surface of a core rod that forms the inner circumferential surface of the through hole. Accordingly, not only can the rotation transmission member be manufactured in large volume and cheaply by powder metallurgical production, but the mold that is used to manufacture the rotation transmission member can also be easily manufactured. As a result, the apparatus manufacturing costs can be decreased.

In this rotation transmission member, it is possible for the protrusion-shaped portions to be a plurality of convex bars that extend rectilinearly from one end of the ring-shaped surface to an end portion of the through hole. It is also preferable that the pluralities of convex bars are placed equally in the circumferential direction of the inner circumferential surface.

According to the rotation transmission member that is constructed in this manner, it is possible as a result of the plurality of convex bars to prevent rotational displacement of the two members even more effectively.

Furthermore, the present invention provides a rotation transmission assembly that includes: a rotation transmission member in a center of which there is a substantially circular cylinder shaped through hole that is formed by an inner circumferential surface, and that includes a rotation transmission portion that is formed in a substantially circular plate configuration and that is located on an outer circumferential portion of the rotation transmission member; and an inner side member that is press-inserted into the through hole. In this rotation transmission assembly, the inner circumferential surface of the rotation transmission member is provided with: a smooth ring-shaped surface that is placed adjacent to one end of the inner circumferential surface; and a plurality of protrusion-shaped portions that, taking the ring-shaped surface as a basis, protrude inwards in the radial direction, and extend along a portion of the length in the axial direction of the through hole, and the inner side member and the rotation transmission member mesh with each other within the range in which the protrusion-shaped portions extend, and are in surface contact with each other within a range in which the ring-shaped surface extends.

According to the rotation transmission assembly that is constructed in this manner, the rotation transmission member and the inner side member are firmly fixed by the press-insertion and by the biting of the protrusion-shaped portions into the outer circumferential surface of the inner side member that has been press-inserted and thereby been increased in density. Namely, as a result of the press-insertion engagement of the two members extending over the entire length in the axial direction and over the entire circumference thereof, and as a result of the deformation resistance of the protrusion-shaped portions on the inner circumferential surface of the rotation transmission member to the outer circumferential surface of the inner side member whose density has been increased by the press-insertion, displacement resistance is effectively provided. Accordingly, a compact engagement is provided between the inner side member and the rotation transmission member that is receiving a rotation force, and it is possible to achieve a rotation transmission assembly that can be rotated integrally without any slippage in either the axial direction or the rotation direction.

Moreover, as a result of the protrusion-shaped portions being formed so as to occupy a portion in the axial direction of the inner circumferential surface, the two members abut at the front end surfaces in the press-insertion direction of the protrusion-shaped portions so that movement in the press-insertion direction is restricted, enabling displacement in the axial direction to be prevented.

It is also possible for the protrusion-shaped portions to be a plurality of convex bars that extend rectilinearly from one end of the ring-shaped surface to an end portion of the through hole. In addition, it is preferable that the plurality of convex bars are placed equally in the circumferential direction of the inner circumferential surface.

According to this structure, it is possible as a result of the plurality of convex bars to prevent rotational displacement of the two members more effectively.

The inner side member is press-inserted from the side where the convex bars are not formed in a direction heading towards the side where the convex bars are formed. Namely, the inner side member is inserted from the ring-shaped surface towards the portion where the convex bars are formed. As a result, because the protrusion-shaped portions are press-inserted so as to press into the outer circumferential surface of the inner side member which is in a compressed state along its entire circumference, the inner side member can be uniformly compressed and engaged by press-insertion.

In addition, in this rotation transmission assembly, the rotation transmission member and the inner side member can be easily manufactured by powder molding and sintering. Namely, when the rotation transmission member is manufactured by powder press molding, groove configurations that are used to form the protrusion-shaped portions can be easily provided by cutting or grinding on an outer circumferential surface of a core rod that forms the inner circumferential surface of the through hole. Accordingly, not only can the rotation transmission member and inner side member be manufactured in large volume and cheaply by powder metallurgical production, but the mold that is used to manufacture the rotation transmission member can also be easily manufactured. As a result, the apparatus manufacturing costs can be decreased.

It is also possible for the rotation transmission member to be formed as a gear that has a plurality of teeth on the rotation transmission portion, and the inner side member is formed as a cylindrical bearing member. In addition, a gear mechanism can be manufactured using this type of rotation transmission member, namely, gear.

According to this structure, because the gear and bearing member are firmly fixed by the press-insertion and by the biting of the protrusion-shaped portions into the outer circumferential surface of the bearing member that has been press-inserted and thereby been increased in density, it is possible to achieve a gear mechanism that is mechanically efficient and enables the gear and bearing member that mutually receive rotation force to be rotated integrally without any slippage.

In particular, as a result of the two members being engaged by a compact structure, because a reduction in the size of the gear and bearing member is made possible, this structure is favorable for, for example, planetary gears for achieving a reduction in the size of a planetary gear mechanism.

Furthermore, because the gear and bearing member abut against each other at the front end surfaces in the press-insertion direction of the protrusion-shaped portions due to the protrusion-shaped portions biting into the outer circumferential surface of the bearing member, movement of the two members in the press-insertion direction is restricted, enabling displacement in the axial direction to be prevented. As a result, the two members can be used without any displacement occurring even if force is received in the axial direction. This enables the generation of noise and abnormal wear to be prevented, and a gear mechanism that has consistent drive to be obtained.

In the above described gear mechanism, it is also possible for the protrusion shaped portions to be convex bars that protrude in the radial direction so as to extend from one end in the axial direction to a point partway along.

According to this structure, because rotational displacement of the two members is effectively prevented by these protrusion shaped portions, a gear mechanism that is even more mechanically efficient and has certain drive can be obtained.

The bearing member is press-inserted from the side where the convex bars are not formed in a direction heading towards the side where the convex bars are formed. As a result, because the protrusion shaped portions are press-inserted so as to press into the outer circumferential surface of the bearing member which is in a compressed state along its entire circumference, the bearing member can be uniformly compressed and engaged by press-insertion, and the bearing surfaces of the gear can be accurately formed.

In addition, in this gear mechanism, the gear and the bearing member can be easily manufactured by powder molding and sintering. Namely, when the gear is manufactured by powder press molding, groove configurations that are used to form the protrusion shaped portions can be easily provided by cutting or grinding on an outer circumferential surface of a core rod that forms the inner circumferential surface of the through hole. Accordingly, not only can the gear and bearing member be manufactured in large volume and cheaply by powder metallurgical production, but the mold that is used to manufacture the gear can also be easily manufactured. As a result, the apparatus manufacturing costs can be decreased. This enables the gear mechanism to be manufactured at low cost.

Note that in the above described rotation transmission member, the convex bars that extend from one end in the axial direction do not need to be provided from the end surface of the rotation transmission member and if a through hole chamfer and spot facing portion are provided in the rotation transmission member the convex bars may be provided from one end of the through hole excepting the chamfer and spot facing portion.

In addition, the present invention provides a method for assembling a rotation transmission assembly that includes a rotation transmission member and an inner side member. In this case, the rotation transmission member is formed in a substantially circular plate configuration, has a substantially circular cylinder shaped through hole that is formed by an inner circumferential surface in the center thereof, and includes a rotation transmission portion that is located on an outer circumferential portion of the rotation transmission member. The inner circumferential surface of the rotation transmission member is provided with a smooth ring-shaped surface that is placed adjacent to one end of the inner circumferential surface; and a plurality of protrusion shaped portions that, taking the ring-shaped surface as a basis, protrude inwards in the radial direction, and extend along a portion of the length in the axial direction of the through hole. The inner side member is formed in a substantially circular cylinder shape whose diameter is larger than an inner diameter of the ring-shaped surface and that has a smooth outer circumferential surface. The method of the present invention includes: a step in which the inner side member is placed adjacent to the ring-shaped surface of the rotation transmission member; and a step in which the inner side member is press-inserted into the through hole in the rotation transmission member until one end of the inner side member goes beyond the protrusion shaped portions.

In addition, the present invention provides a rotation transmission assembly that includes: a rotation transmission member that is formed in a substantially circular plate configuration, in a center of which there is a substantially circular cylinder shaped through hole that is formed by an inner circumferential surface, and that includes a rotation transmission portion that is located on an outer circumferential portion of the rotation transmission member; and an inner side member whose length in the axial direction is longer than the through hole, and that is formed in a substantially circular cylinder shape and is press-inserted into the through hole. In this rotation transmission assembly, both end portions of the inner side member protrude as protruding portions from end portions of the inner circumferential surface of the rotation transmission member, and at least one portion of the protruding portions is made to protrude outwards in the radial direction beyond the diameter of the inner circumferential surface by plastic deformation, and is tightly adhered to the end portion of the inner circumferential surface.

According to the above described rotation transmission assembly, both the end portions of the inner side member protrude as protruding portions from the end portions of the inner circumferential surface of the rotation transmission member, and at least one portion of the protruding portions is made to protrude outwards in the radial direction beyond the diameter of the inner circumferential surface by plastic deformation, and is tightly adhered to the end portion of the inner circumferential surface. Namely, because the rotation transmission member is sandwiched between the two protruding portions of the inner side member, displacement of the two members in the axial direction can be prevented.

In the above described rotation transmission assembly, it is also possible for a plurality of chamfered portions that each have a different chamfer angle to be formed on an inner surface of each end portion of the inner side member.

According to this structure, because a plurality of chamfers are formed in stages on the center hole of the inner side member, it is possible to prevent a shaft that has been inserted into this center hole from being cut by acute angular portions of the inner side member and, as a result, becoming damaged.

Accordingly, according to this rotation transmission assembly, drive loss or damage to components to be caused by displacement in the rotation direction and axial direction can be prevented, and it is possible to reliably transmit rotational force. In addition, because a rotation transmission member and inner side member having configurations such as these are each able to be obtained by powder press molding, they can be manufactured by sintering which can produce large volume and at low cost. Furthermore, because the engagement structure between the rotation transmission member and inner side member is compact, a reduction in the size of the rotation transmission assembly can be achieved.

In the above described rotation transmission assembly, it is also possible for the inner circumferential surface of the rotation transmission member to have a plurality of convex bars that extend over the length of the through hole, and for the inner side member to mesh with the plurality of convex bars as it is deformed.

In the above described rotation transmission assembly, it is also possible for the rotation transmission member to be formed as a gear that has a plurality of teeth on the rotation transmission portion, and for the inner side member to be formed as a bearing member. Moreover, a gear mechanism can be constructed using this type of rotation transmission assembly.

According to this gear mechanism, both end portions of the bearing member protrude as protruding portions from end portions of the inner circumferential surface of the gear, and at least one portion of the protruding portions is made to protrude outwards in the radial direction beyond the diameter of the inner circumferential surface by plastic deformation, and is tightly adhered to the end portion of the inner circumferential surface. Namely, because the gear is sandwiched between the two protruding portions of the bearing member, displacement of the two members in the axial direction can be prevented.

In this gear mechanism, it is also possible for a plurality of chamfered portions that each have a different chamfer angle to be formed on both end portions in stages in the axial direction of the center hole.

According to this structure, because a plurality of chamfers are formed in stages on the center hole of the bearing member, it is possible to prevent a shaft that has been inserted into this center hole from being cut by acute angular portions of the inner side member and, as a result, becoming damaged.

Accordingly, according to this gear mechanism, using a gear that has an anti-rotation function and an anti-release function, and is able to reliably transmit rotation force, the mechanical efficiency can be improved.

In addition, because a gear member and bearing member having configurations such as these are each able to be obtained by powder press molding, they can be manufactured by sintering which makes possible the production of gear mechanisms in large volume and at low cost.

Furthermore, a reduction in size as well as an improvement in performance of a planetary gear mechanism can be obtained thanks to the achieving of a small size gear in which the bearing member and gear member are reliably fixed by a compact engagement structure.

In addition, the present invention provides a method for assembling a rotation transmission assembly that includes a rotation transmission member and an inner side member. In this case, the rotation transmission member, formed in a substantially circular plate configuration, has a substantially circular cylinder shaped through hole that is formed by an inner circumferential surface in the center thereof, and includes a rotation transmission portion located on an outer circumferential portion of the rotation transmission member. The inner side member is formed in a substantially circular cylinder shape whose length in the axial direction is longer than the through hole and whose outer diameter is larger than the inner diameter of the ring-shaped surface, and that has a center hole that penetrates the substantially circular cylinder shape. The method of the present invention includes: a step in which the inner side member is press-inserted into the through hole in the rotation transmission member, and both ends of the inner side member are made to protrude from the through hole as protruding portions; and a step in which at least a portion of both the protruding portions is made to protrude outwards in the radial direction beyond the diameter of the inner circumferential surface, and is tightly adhered to the end portion of the inner circumferential surface so as to be plastically deformed.

In the above described method, it is possible for the step that plastically deforms the two protruding portions to be performed by pushing two tools that have conical surfaces whose maximum outer diameter is larger than the diameter of the center hole of the inner side member into the center hole.

In the above described method, it is possible for inner surfaces of both end portions of the inner side member to have a first chamfered portion, and for apex angles of the respective conical surfaces of the two tools to be smaller than an apex angle of a conical surface that prescribes the first chamfered portion, and in the step that plastically deforms the two protruding portions, it is possible for a second chamfered portion whose chamfer angle is different from that of the first chamfered portion to be formed on the inner circumference of the two end portions of the inner side member.

According to this method, by forming two chamfered configurations in the center hole of the inner side member, the ease with which the shaft is inserted is improved, and sharp edges are done away with. As a result, it is possible to prevent the shaft that is inserted into this center hole from being damaged.

Moreover, by making the outer diameter of the protruding portions of the inner side member that protrude from the through hole larger than the inner diameter of the through hole, it is possible to prevent the inner side member from being displaced in the axial direction relative to the rotation transmission member (i.e., relative to the through hole).

According to the above described method, because the forming of the two chamfered configurations can be performed at the same time as the plastic deformation step that enlarges the diameter of the protruding portions of the inner side member, the rotation transmission member and the inner side member can be assembled and fixed together easily and quickly.

According to the above described method, because the forming of the two chamfered configurations on the inner circumferential surface of the center hole of the inner side member can be performed at the same time as the enlarging of the diameter of the protruding portions simply by pressing the conical surface that has a more acute angle than the first chamfered portion into the center hole, the two members can be fixed together with a simpler operability.

The present invention also provides a rotation transmission assembly that includes: a rotation transmission member that is formed in a substantially circular plate configuration, in a center of which there is a substantially circular cylinder shaped through hole that is formed by an inner circumferential surface and extends from a first end portion to a second end portion, and that includes a rotation transmission portion located on an outer circumferential portion of the rotation transmission member; and an inner side member that is press-inserted into the through hole. In this rotation transmission assembly, the inner circumferential surface of the rotation transmission member includes: a smooth ring-shaped surface that is placed adjacent to the first end portion; and a plurality of convex bars that, taking the ring-shaped surface as a basis, protrude inwards in the radial direction, and extend rectilinearly from one end of the ring-shaped surface to the second end portion. The inner side member and the rotation transmission member mesh with each other within the range in which the convex bars extend, and are in surface contact with each other within a range in which the ring-shaped surface extends, and one end portion of the inner side member protrudes as a protruding portion from the second end portion of the inner circumferential surface, and at least one portion of the protruding portion is made to protrude outwards in the radial direction beyond the diameter of the inner circumferential surface by plastic deformation, and is tightly adhered to the second end portion of the inner circumferential surface.

According to the above described rotation transmission assembly, in addition to the fixing by the press-insertion, the rotation transmission member and the inner side member are even more firmly fixed by the convex bars biting into the outer circumferential surface of the press-inserted inner side member. Moreover, on the front side in the press-insertion direction, because at least one portion of the protruding portion of the inner side member is made to protrude outwards in the radial direction beyond the diameter of the inner circumferential surface of the rotation transmission member by plastic deformation, it is possible to prevent the inner side member from being displaced to the rear in the press-insertion direction relative to the rotation transmission member.

Accordingly, the rotation transmission member and inner side member that mutually receive rotation force can be engaged in a compact form, and can be rotated integrally without any slippage even in the axial direction.

Moreover, because the convex bars restrict movement of the bearing member to the front by abutting against the bearing member at the end surfaces on the rear side in the direction in which the bearing member is press-inserted into the rotation member, in addition to a plastic deformation that restricts movement to the rear, it is possible to effectively prevent displacement of the two members to the front and rear in the press-insertion direction.

In the above described rotation transmission assembly, it is also possible for a plurality of chamfered portions that each have a different chamfer angle to be formed on an inner surface of each end portion of the inner side member.

According to this structure, because a plurality of chamfers are formed in stages, it is possible to prevent a shaft that has been inserted into the center hole from being cut by acute angular portions of the bearing member and, as a result, becoming damaged.

In the above described rotation transmission assembly, it is also possible for the rotation transmission member to be formed as a gear that has a plurality of teeth on the rotation transmission portion, and for the inner side member to be formed as a bearing member. Moreover, a gear mechanism can be constructed using this type of rotation transmission assembly.

According to this structure, in addition to the fixing by the press-insertion, the gear member and the bearing member are even more firmly fixed by the convex bars biting into the outer circumferential surface of the press-inserted bearing member. Moreover, because a plastic deformation is applied to the bearing member on the front side in the press-insertion direction, it is possible to prevent the bearing member from being displaced to the rear in the press-insertion direction relative to the gear member.

Accordingly, by achieving a rotation transmission assembly that is formed by the gear member and the bearing member that are engaged in a compact form and can be rotated integrally even in the axial direction, it is possible to provide a small size, high-performance gear mechanism that is mechanically extremely efficient and has little generation of noise and abnormal wear.

Moreover, according to the above described gear mechanism, because the convex bars restrict movement of the bearing member to the front by abutting against the bearing member at the end surfaces on the rear side in the direction in which the bearing member is press-inserted into the gear member, in addition to a plastic deformation that restricts movement to the rear, it is possible to effectively prevent displacement of the two members to the front and rear in the press-insertion direction.

Accordingly, it is possible in a gear mechanism to prevent the gear member and bearing member that constitute the rotation transmission assembly from being displaced to the front and rear in the press-insertion direction (i.e., in the axial direction), and it is possible to provide a small size, high-performance gear mechanism that is mechanically extremely efficient and has little generation of noise and abnormal wear.

In the above described gear mechanism, it is also possible for a center hole that has a plurality of chamfered configurations that each have a different chamfer angle to be formed in the bearing member.

According to this structure, as a result of providing a plurality of chamfers in stages, it is possible to prevent a shaft that has been inserted into the center hole from being cut by acute angular portions of the bearing member and, as a result, becoming damaged. Therefore, the gear mechanism can be provided that restricts component damage, and can be assembled with good operability.

The present invention also provides a method for assembling a rotation transmission assembly that includes a rotation transmission member and an inner side member. In this case, the rotation transmission member formed in a substantially circular plate configuration, has a substantially circular cylinder shaped through hole that is formed by an inner circumferential surface in the center thereof, and includes a rotation transmission portion located on an outer circumferential portion of the rotation transmission member. The inner circumferential surface of the rotation transmission member is provided with: a smooth ring-shaped surface that is placed adjacent to the first end portion of the inner circumferential surface; and a plurality of convex bars that, taking the ring-shaped surface as a basis, protrude inwards in the radial direction, and extend rectilinearly from one end of the ring-shaped surface to the second end portion of the inner circumferential surface. The inner side member is formed in a substantially circular cylinder shape whose diameter is larger than an inner diameter of the ring-shaped surface and that has a smooth outer circumferential surface. The method of the present invention includes: a step in which the inner side member is placed adjacent to the first end portion of the inner circumferential surface of the rotation transmission member; a step in which the inner side member is press-inserted into the through hole in the rotation transmission member, and one end of the inner side member is made to protrude from the second end portion of the inner circumferential surface as a protruding portion; and a step in which at least a portion of the protruding portion is made to protrude outwards in the radial direction beyond the diameter of the inner circumferential surface, and is plastically deformed so as to tightly abut against the end portion of the inner circumferential surface.

In this method, it is also possible for the inner side member to be formed in a substantially circular cylinder shape and have a center hole that penetrates the substantially circular cylinder shape, and for the step that plastically deforms the protruding portion to be performed by a diameter enlarging step in which a tool that has a conical surface whose maximum outer diameter is larger than the diameter of the center hole of the inner side member is pushed into the center hole.

In this method, it is also possible for the protruding portion of the inner side member to have a first chamfered portion on an inner side thereof, and for an apex angle of the conical surface of the tool to be smaller than an apex angle of a conical surface that prescribes the first chamfered portion, and in the diameter enlarging step, for a second chamfered portion whose chamfer angle is different from that of the first chamfered portion to be formed on an inner side of the protruding portion of the inner side member.

According to this method, by making the outer diameter of the protruding portions of the inner side member that protrude from the through hole larger than the inner diameter of the through hole, the inner side member can be fixed such that it is not displaced in the axial direction relative to the rotation member (i.e., relative to the through hole).

Moreover, by forming two chamfer configurations in the center hole, the shaft can be easily inserted in the inner side member (i.e., in the through hole). In addition, because there are no sharp edges in the center hole, the shaft can be inserted to the inner side member without damaging.

According to the above described method, because the forming of the two chamfered configurations can be performed at the same time as the task of enlarging the diameter of the protruding portions of the inner side member, the rotation transmission member and the inner side member can be assembled and fixed together easily and quickly.

According to the above described method, because the forming of the two chamfered configurations on the inner circumferential surface of the center hole of the inner side member can be performed at the same time as the enlarging of the diameter of the protruding portions simply by pressing a diameter enlarging tool that has a conical surface that has a more acute angle than that of the first chamfered portion into the center hole, the rotation transmission member and the inner side member can be fixed together with a simpler operability.

BEST MODE FOR CARRYING OUT THE INVENTION

A first embodiment of the present invention will now be described with reference made to FIGS. 1 through 5.

Figure 1:
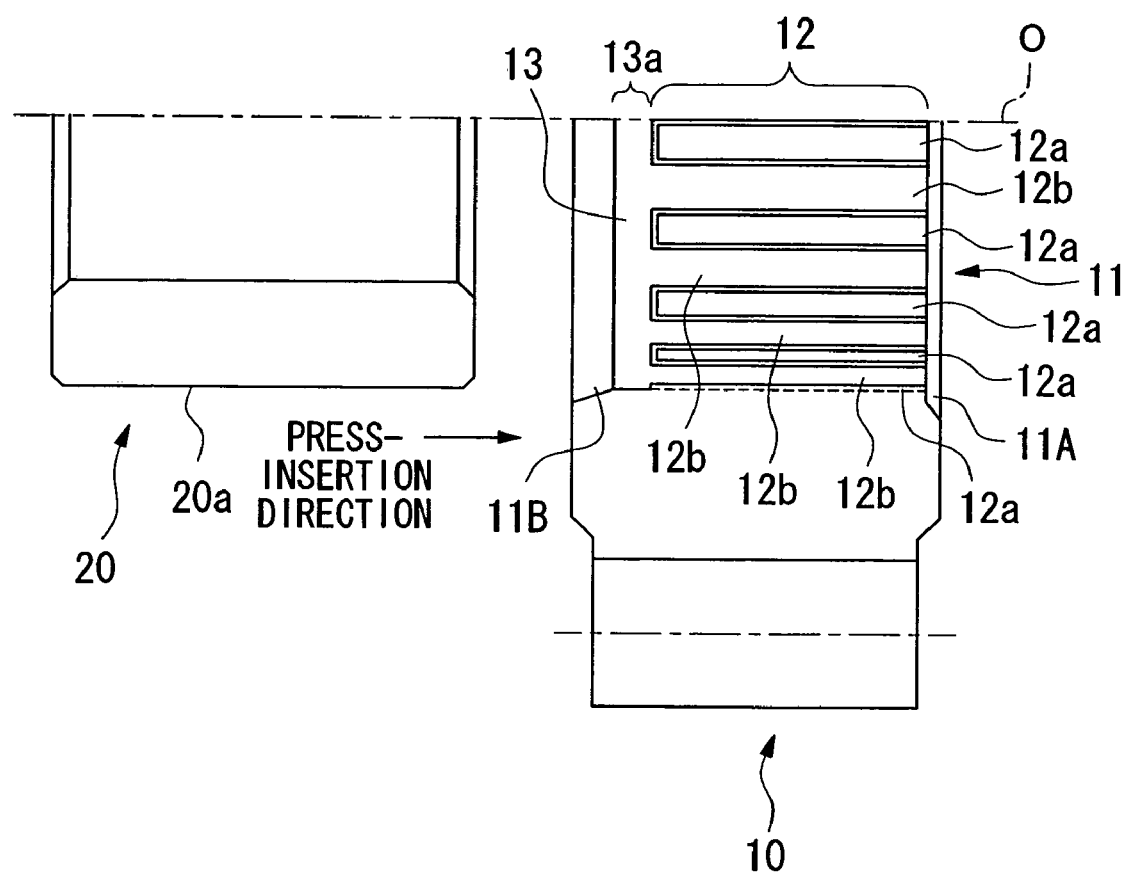
FIG. 1 is a half sectional view showing a rotation transmission member according to a first embodiment of the present invention, and a member that fits together with the rotation transmission member.

FIG. 1 is a cross-sectional view showing a gear member 10, which is a rotation transmission member according to the first embodiment of the present invention, and a bearing member 20, which is an inner side member that fits together with the gear member 10. A rotation transmission member attached to bearing (i.e., rotation transmission assembly) 30 (see FIG. 2), which is a rotation transmission assembly that is formed by attaching the bearing member 20 to the gear member 10, is a planetary gear of a planetary gear mechanism 40 such as that shown in FIG. 4, which is used in a deceleration mechanism or the like. The rotation transmission member attached to bearing 30 is used by inserting a rotation support shaft thereof on an inner side of the bearing member 20. Accordingly, the gear member 10 is preferably formed from a high strength material suitable for a gear, and the bearing member 20 is preferably formed from a material that has good slidability relative to the rotation support shaft.

The gear member 10 has a configuration in which gear teeth are formed on an outer circumferential surface thereof. A press-insertion hole 11 is formed as a through hole that extends completely through the gear member 10 in the direction of an axis O. This press-insertion hole 11 is formed by a substantially cylindrical press-insertion surface 13. The press-insertion surface 13 is provided with a smooth, ring-shaped surface 13a and a plurality of convex bars (i.e., protrusion shaped portions) 12a that, taking the ring-shaped surface 13a as a basis, are provided in sequence in the circumferential direction so as to protrude inwards in the radial direction. A spot facing portion 11A and a chamfered portion 11B are formed at the two ends of the press-insertion surface 13.

The plurality of convex bars 12a are arranged equally in the circumferential direction (in the present embodiment 18 bars are placed at 10 degree intervals), and are provided extending from the spot facing portion 11A side end of the press-insertion hole 11 in a direction towards the chamfered portion 11B side end of the press-insertion hole 11 as far as a point partway along the press-insertion surface 13. Note that, in the gear member 10 of the present embodiment, the inner diameter of the ring-shaped surface 13a, namely, the diameter of the press-insertion hole 11 is taken as 10 mm, and the height of each convex bar 12a from the ring-shaped surface 13a is formed so as to be between 0.5 to 10 µm. In addition, press-insertion surfaces 12b are formed between the respective convex bars 12a having the same diameter as the ring-shaped surface 13a.

The bearing member 20 is formed in a circular cylinder configuration having an outer circumferential surface 20a that is slightly larger than the press-insertion surfaces 13 and 12b.

A description will now be given of the assembly of the gear member 10 and the bearing member 20 that are formed in the manner described above, and of the planetary gear 30 that is formed by assembling these two members.

The bearing member 20 is press-inserted into the press-insertion hole 11 from the chamfered portion 11B side where the convex bars 12a are not formed, as is shown in FIG. 1, moving towards the side where the convex bars 12a are formed (i.e., from left to right in FIG. 1). At this time, the outer circumferential surface 20a of the bearing member 20 is firstly guided by the chamfered portion 11B so as to fit with the smooth ring-shaped surface 13a, and be assembled without any tilting in the press-insertion hole 11.

Figure 2:
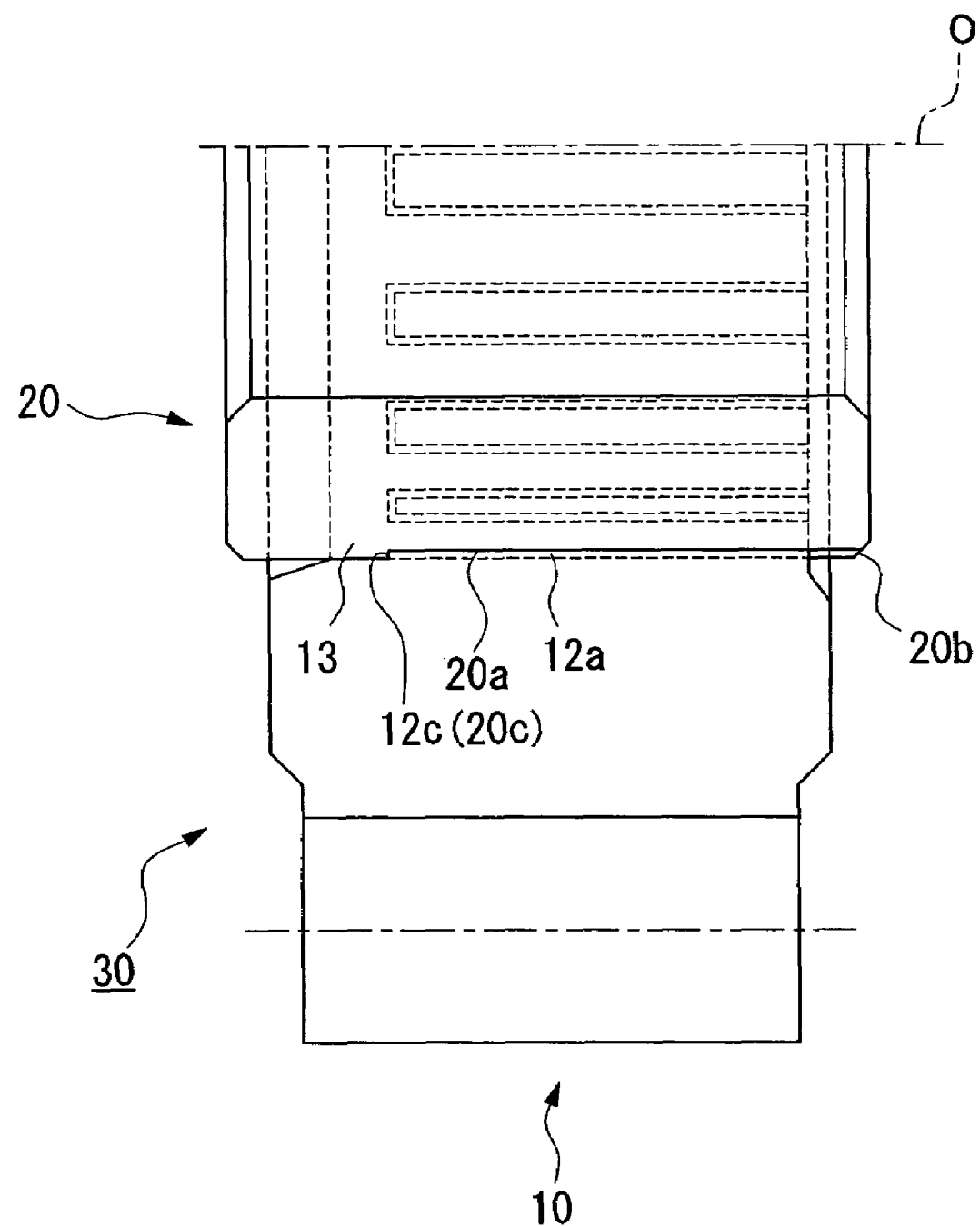
FIG. 2 is a half sectional view showing a rotation transmission member attached to bearing; an inner side member is press-inserted into a press-insertion hole of the rotation transmission member shown in FIG. 1.
Figure 3:
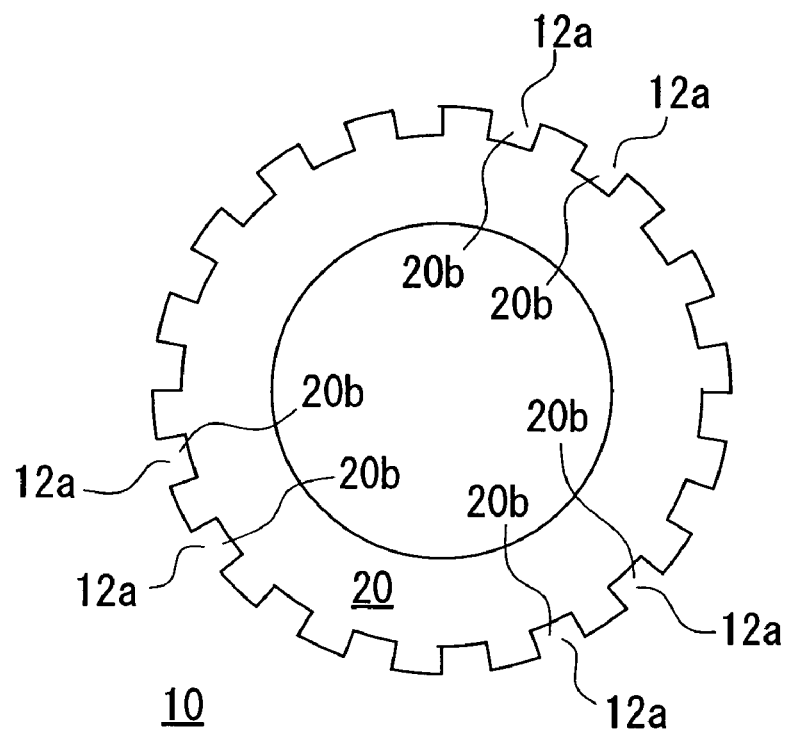
FIG. 3 is an enlarged view of principal portions of a rotation transmission member attached to bearing that is made up of the rotation transmission member and the inner side member shown in FIG. 2.
Figure 4:
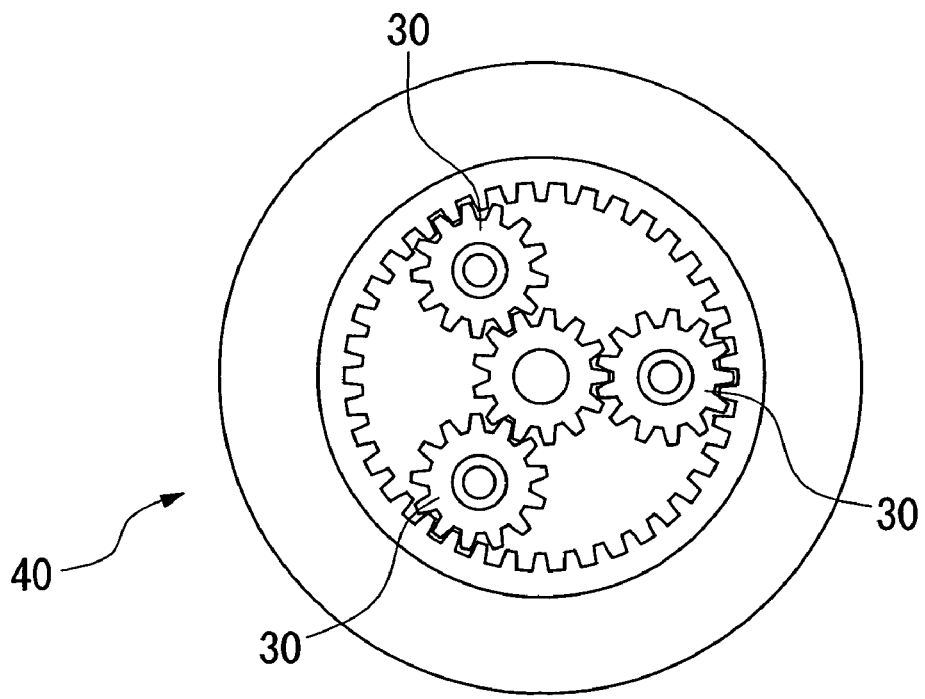
FIG. 4 is a view showing a planetary gear mechanism.

If the bearing member 20 is then pushed further into the press-insertion hole 11, as is shown in FIG. 2, at the same time as the bearing member 20 is fastened by the press-insertion surfaces 12b, meshing portions 20b are formed where the respective convex bars 12a press into the outer circumferential surface 20a. As a result, as is shown in FIG. 3, the gear member 10 and the bearing member 20 are placed in a state of being fixed together by the fastening of the press-insertion surfaces 13 and 12b with the outer circumferential surface 20a, and by the meshed configuration that is formed by the respective convex bars 12a and the meshing portions 20b.

As a result of the two members being assembled in this manner, the planetary gear 30 is formed that is able to prevent displacement in the rotation direction and in the axial direction. Namely, not only does the meshing between the convex bars 12a and the meshing portion 20b form an anti-rotation baffle, but when a force towards the right side in the axial direction as seen in FIG. 2 is applied to the bearing member 20, end surfaces 12c of the convex bars 12a abut against end surfaces 20c of the meshing portions 20b and form an anti-displacement device. In order to move the bearing member 20 from this state to the right in the axial direction relative to the gear member 10, a huge force is required that can overcome the force that is needed by the end surfaces 12c of the convex bars 12a to cut into the outer circumferential surface 20a of the bearing member 20.

Note that, in the drawings, the shape of the meshing formed by the convex bars 12a and the meshing portions 20b has been enlarged and shown in a magnified size in order to simplify the description, however, even if the difference between the top and bottom of the meshing configuration is approximately 0.5 to 10 μm, as mentioned above, it is possible to obtain a sufficient effect of preventing displacement in the rotation direction and the axial direction.

A second embodiment of the present invention will now be described with reference made to FIGS. 6 through 10.

Figure 5:
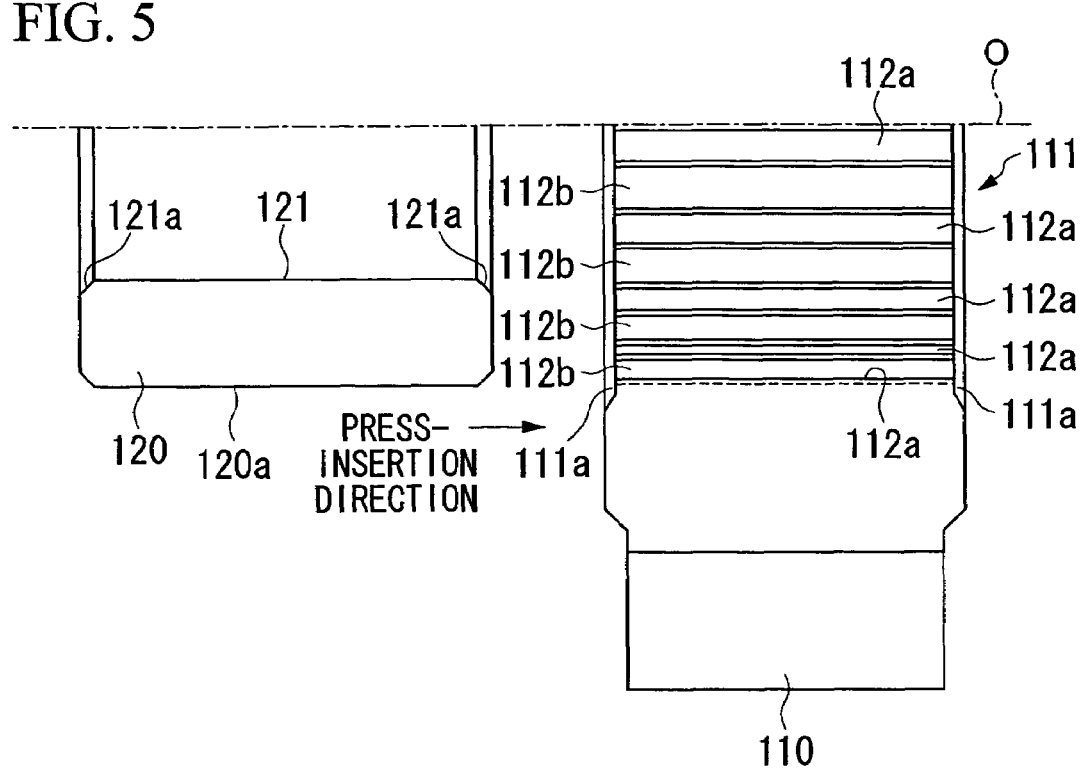
FIG. 5 is a half sectional view showing a second embodiment of the present invention, and showing a rotation transmission member and a bearing member that fits together with this rotation transmission member.

FIG. 5 is a cross-sectional view showing a gear member (i.e., a rotation transmission member) 110 and a bearing member (i.e., an inner side member) 120 that form a rotation transmission member attached to bearing (i.e., a rotation transmission assembly or a planetary gear) 130 according to the second embodiment of the present invention. The planetary gear 130 (see FIG. 7), which is formed by attaching the bearing member 120 to the gear member 110, is used in a planetary gear mechanism (i.e., a gear mechanism) 140 such as that shown in FIG. 10, which is used in a deceleration mechanism or the like, by inserting a rotation support shaft in a center hole 121 of the bearing member 120. Accordingly, the gear member 110 is preferably formed from a high strength material suitable for a gear, and the bearing member 120 is preferably formed from a material that has good slidability relative to the rotation support shaft. In addition, the gear member 110 and the bearing member 120 are able to be produced in large quantities at low cost by powder molding and sintering.

As is shown in FIG. 5, the gear member 110 has a configuration in which gear teeth are formed on an outer circumferential surface thereof. A press-insertion hole 111 is formed as a through hole that extends completely through the gear member 110 in the direction of an axis O. A plurality of convex bars 112a that protrude inwards in the radial direction of this press-insertion hole 111 and extend in the axial direction thereof are formed in sequence in the circumferential direction on the inner peripheral surface of the press-insertion hole 111. Run off portions 111a formed by spot facing and chamfer processing are formed respectively at the two ends of the press-insertion hole 111.

The plurality of convex bars 112a that protrude inwardly in the radial direction of the press-insertion hole 111 are arranged equally in the circumferential direction (in the present embodiment 18 bars are placed at 10 degree intervals). Note that, in the gear member 110 of the present embodiment, the inner diameter of the convex bars 112a portion is taken as 10 mm, which is the same diameter of the press-insertion hole 111, and the difference between the top of the convex bars 112a and press-insertion surfaces 112b where is the bottom of between each convex bar 112a (i.e., the knurl height) is formed so as to be between 0.5 to 10 μm.

The bearing member 120 has an outer circumferential surface 120a that is formed slightly larger than the press-insertion surface 112b and that is press-inserted into the press-insertion hole 111, and a center hole 121 that penetrates the bearing member 120 in the direction of the axis O. The bearing member 120 is formed in a circular cylinder configuration and has a length in the axial direction that is longer than that of the press-insertion hole 111. When the bearing member 120 is press-inserted in the press-insertion hole 111, the outer circumferential surface 120a is compressed by the press-insertion, and the convex bars 112a further press into the outer circumferential surface 120a. As a result of this, the bearing member 120 is firmly fixed to the gear member 110. A first chamfered portion 121a is formed in advance in each of the end portions in the axial direction of the center hole 121 of the bearing member 120.

A description will now be given of the method for assembling the gear member 110 and bearing member 120 that are formed in the manner described above, and of the planetary gear 130 that is formed by assembling these two members.

Figure 6:
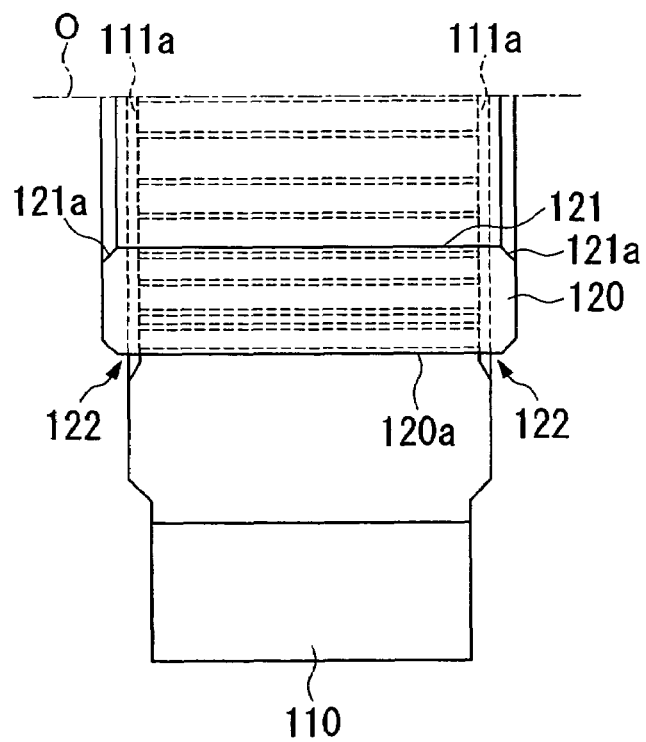
FIG. 6 is a half sectional view showing a state in which the bearing member is press-inserted into the rotation transmission member shown in FIG. 5.
Figure 9:
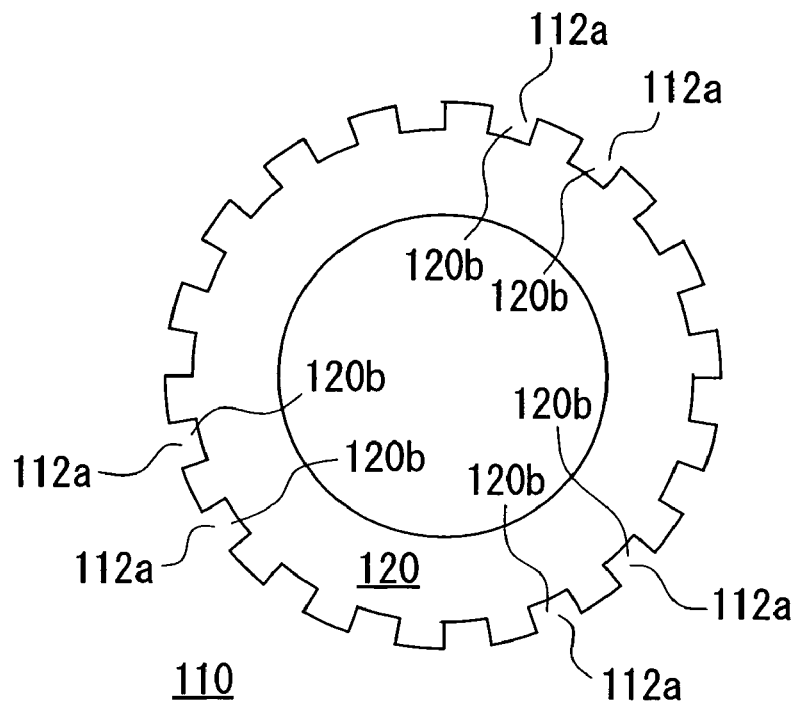
FIG. 9 is an enlarged view of principal portions of the rotation transmission member attached to bearing that is made up of the rotation transmission member and bearing member shown in FIG. 6.
Figure 10:
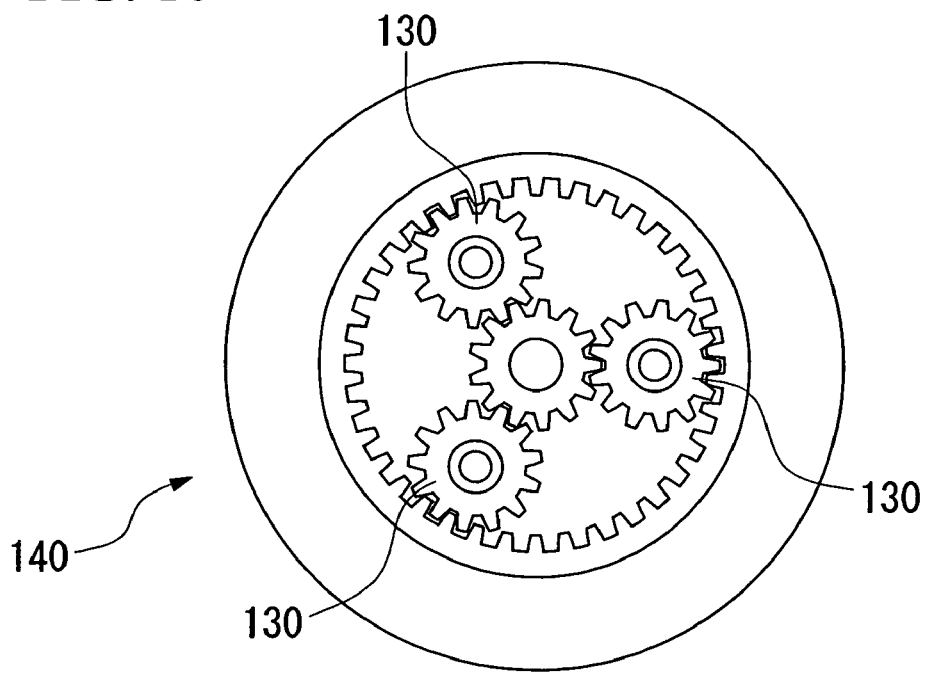
FIG. 10 is a view showing a planetary gear mechanism.

Firstly, the bearing member 120 is press-inserted in the press-insertion hole 111 of the gear member 110 shown in FIG. 5. Next, as is shown in FIG. 6, the two members are assembled such that the two ends of the bearing member 120 protrude from the press-insertion hole 111. As a result of this, because meshing portions 120b are formed by the convex bars 112a on the outer circumferential surface 120a, as is shown in FIG. 6 and FIG. 9, the gear member 110 and the bearing member 120 are meshed together by the convex/concave configuration created by the respective convex bars 112a and the meshing portions 120b, and are placed in a state in which displacement in the rotation direction is prevented.

At this time, because the length of the bearing member 120 in the axial direction is greater than that of the press-insertion hole 111 into which it has been press-inserted, the two ends thereof protrude from the press-insertion hole 111 to form protruding portions 122.

Figure 7:
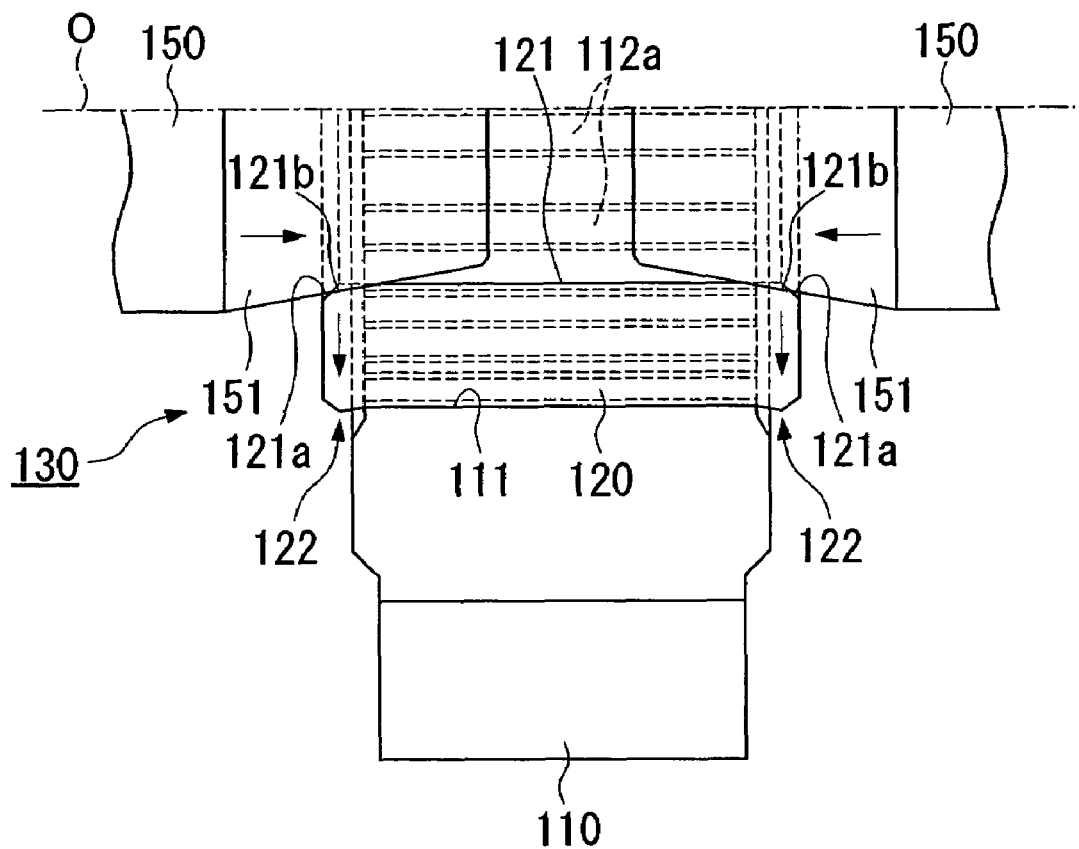
FIG. 7 is a half sectional view showing a plastic deformation step that fixes the bearing member in the rotation transmission member.

Next, by implementing a plastic deformation step shown in FIG. 7 using a tool 150, the bearing member 120 is deformed such that displacement of the two members in the axial direction is prevented. Here, the plastic deformation step refers to a work step in which a mechanical force is applied to a subject member such that a plastic deformation is generated.

The tool 150 has a conical surface 151 that forms a more acute angle relative to the axis O than the chamfer angle (here, 45°) formed by the first chamfered portion 121a that has been formed in the center hole 121 of the bearing member 120 relative to the axis O.

In the plastic deformation step, the tools 150 are pushed from both ends into the center hole 121 in the bearing member 120 that has been press-inserted into the press-insertion hole 111. As a result, the inner circumferential surface of the center hole 121 is gradually widened in diameter in a direction heading from the inner side of the first chamfered portion 121a towards the center in the axial direction by the conical surface 151 of the tool 150. A second chamfered portion 121b whose chamfer angle relative to the axis O is different from that of the first chamfered portion 121a is formed in the bearing member 120 (see FIG. 8).

Figure 8:
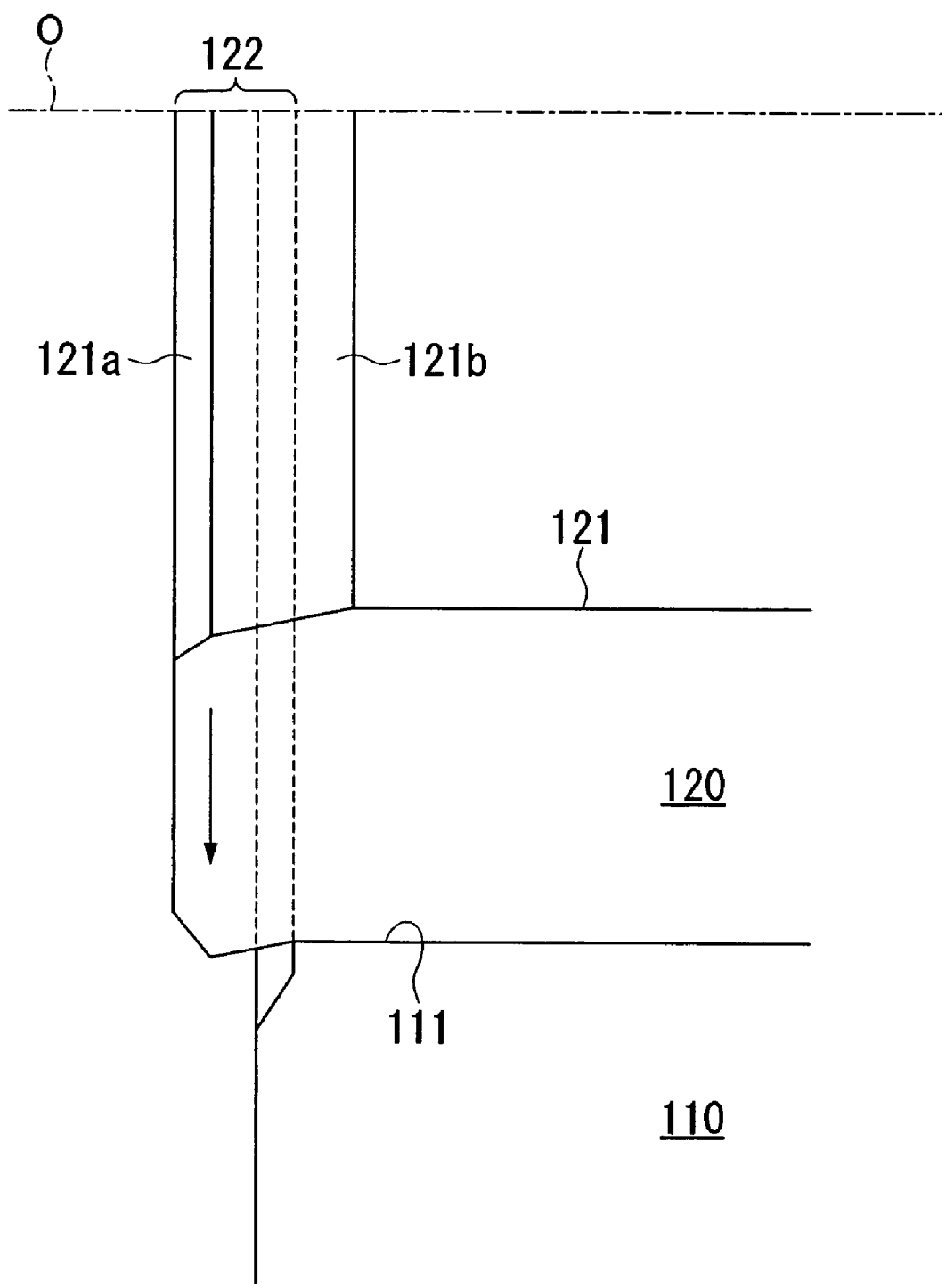
FIG. 8 is an enlarged view showing principal portions of protruding portions and chamfers of the bearing member that is fixed to the rotation transmission member.

At the same time as the second chamfered portion 121b is formed, because the protruding portions 122 of the bearing member 120 that have been pushed out wider from the inner diameter side by the tool 150 are not restricted on the outer circumferential side by the press-insertion hole 111, the protruding portions 122 are pushed outwards in the radial direction, as is shown in FIG. 8, so that the outer diameter thereof is made larger than the inner diameter of the press-insertion hole 111.

In the bearing member 120, as a result of the protruding portions 122, whose diameters have been made larger than the inner diameter of the press-insertion hole 111, sandwiching the gear member 110 in the axial direction using the two ends of the press-insertion hole 111, movement in the axial direction relative to the press-insertion hole 111 (i.e., to the gear member 110) is suppressed.

In the planetary gear 130 that is assembled in this manner, displacement in the rotation direction between the gear member 110 and the bearing member 120 is prevented by the convex bars 112a and the meshing portions 120b, and displacement thereof in the axial direction is prevented by the protruding portions 122.

Note that, in the drawings, the shape after meshing formed by the convex bars 112a and the meshing portions 120b has been enlarged and shown in a magnified size in order to simplify the description; however, even if the difference between the top and bottom of the meshing configuration is approximately 0.5 to 10 µm, as mentioned above, it is possible to obtain a sufficient effect of preventing displacement in the rotation direction and the axial direction.

A third embodiment of the present invention will now be described with reference to FIGS. 11 through 15.

Figure 11:
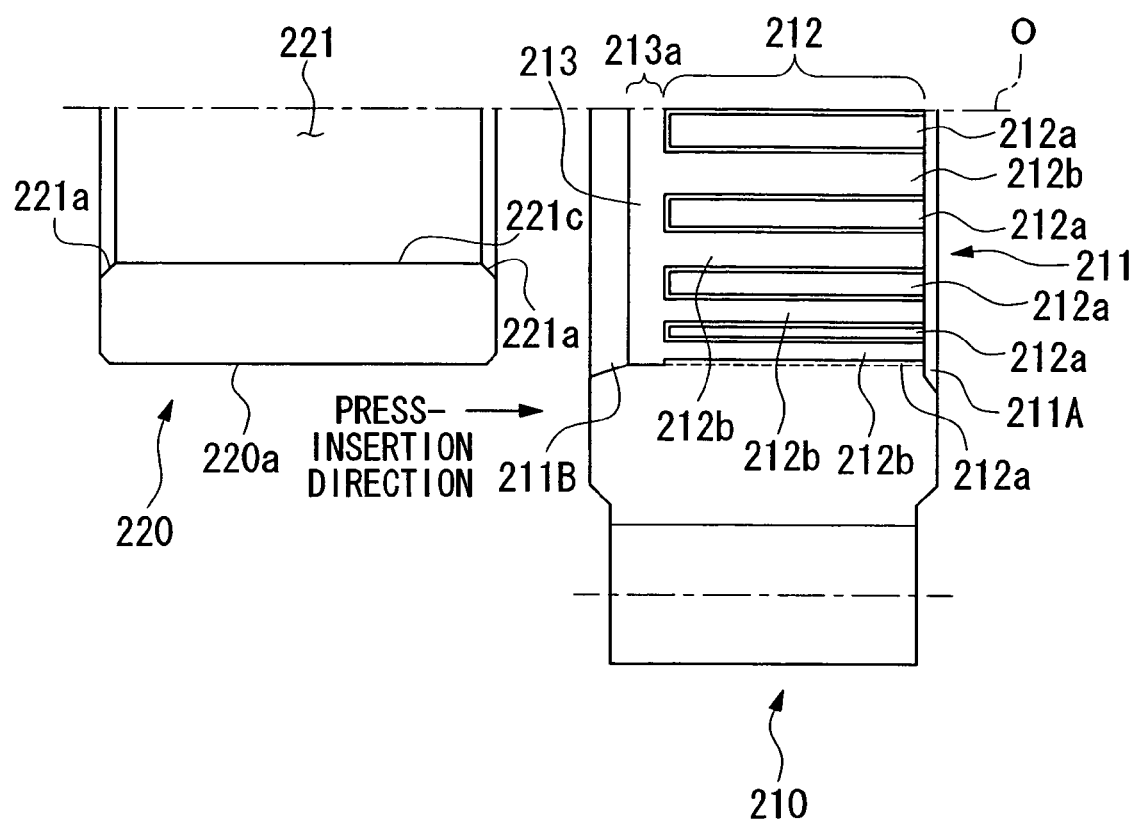
FIG. 11 is a half sectional view showing a rotation member that forms the rotation transmission member according to a third embodiment of the present invention, and a bearing member that fits together with this rotation member.

FIG. 11 is a cross-sectional view showing a gear member 210 that serves as a rotation transmission member that constitutes a rotation transmission assembly 230 of the present embodiment, and a bearing member 220, that serves as an inner side member that is fixed to the gear member 210. A rotation transmission assembly 230 of the present embodiment is a planetary gear of a planetary gear mechanism (i.e., a gear mechanism) 240 such as that shown in FIG. 18, which is used in a deceleration mechanism or the like. The rotation transmission assembly 230 is used by inserting a shaft thereof on an inner side of the bearing member 220. Accordingly, the gear member 210 is preferably formed from a high strength material suitable for a gear, and the bearing member 220 is preferably formed from a material that has good slidability relative to the shaft. In addition, the gear member 210 and the bearing member 220 are able to be produced in large quantities at low cost by powder molding and sintering.

As is shown in FIG. 11, the gear member 210 has a configuration in which gear teeth are formed on an outer circumferential surface thereof. A press-insertion hole 211 is formed as a through hole that extends completely through the gear member 210 in the direction of an axis O. This press-insertion hole 211 is formed by a substantially cylindrical press-insertion surface 213. The press-insertion surface 213 is provided with a smooth, ring-shaped surface 213a and a plurality of convex bars (i.e., protrusion shaped portions) 212a that, taking the ring-shaped surface 213a as a basis, are provided in sequence in the circumferential direction so as to protrude inwards in the radial direction. A spot facing portion 211A and a chamfered portion 211B are formed at the two ends of the press-insertion hole 211.

The plurality of convex bars 212a are arranged equally in the circumferential direction (in the present embodiment 18 bars are placed at 10 degree intervals), and are provided extending from the front side (i.e., the right side in the drawing) in the press-insertion direction in which the bearing member 220 is press-inserted into the gear member 210 towards the rear side (i.e., the left side in the drawing) as far as a point partway along the press-insertion hole 211. Note that, in the gear member 210 of the present embodiment, the inner diameter of the ring-shaped surface 213a, namely, the diameter of the press-insertion hole 211 is taken as 10 mm, and the height of each convex bar 212a from the ring-shaped surface 213a is formed so as to be between 0.5 to 10 µm. In addition, press-insertion surfaces 212b are formed between the respective convex bars 212a having the same diameter as the ring-shaped surface 213a.

As is shown in FIG. 11, the bearing member 220 that is press-inserted into the press-insertion hole 211 of the bearing member 210 has an outer circumferential surface 220a that is formed slightly larger than the press-insertion surfaces 213 and 212b of the press-insertion hole 211, and a center hole 221 in which a first chamfered portion 221a is formed.

A description will now be given of the method for assembling the gear member 210 and the bearing member 220 that are formed in the manner described above, and of the planetary gear 230 (i.e., the rotation transmission assembly) that is formed by fixing these two members together.

Figure 12:
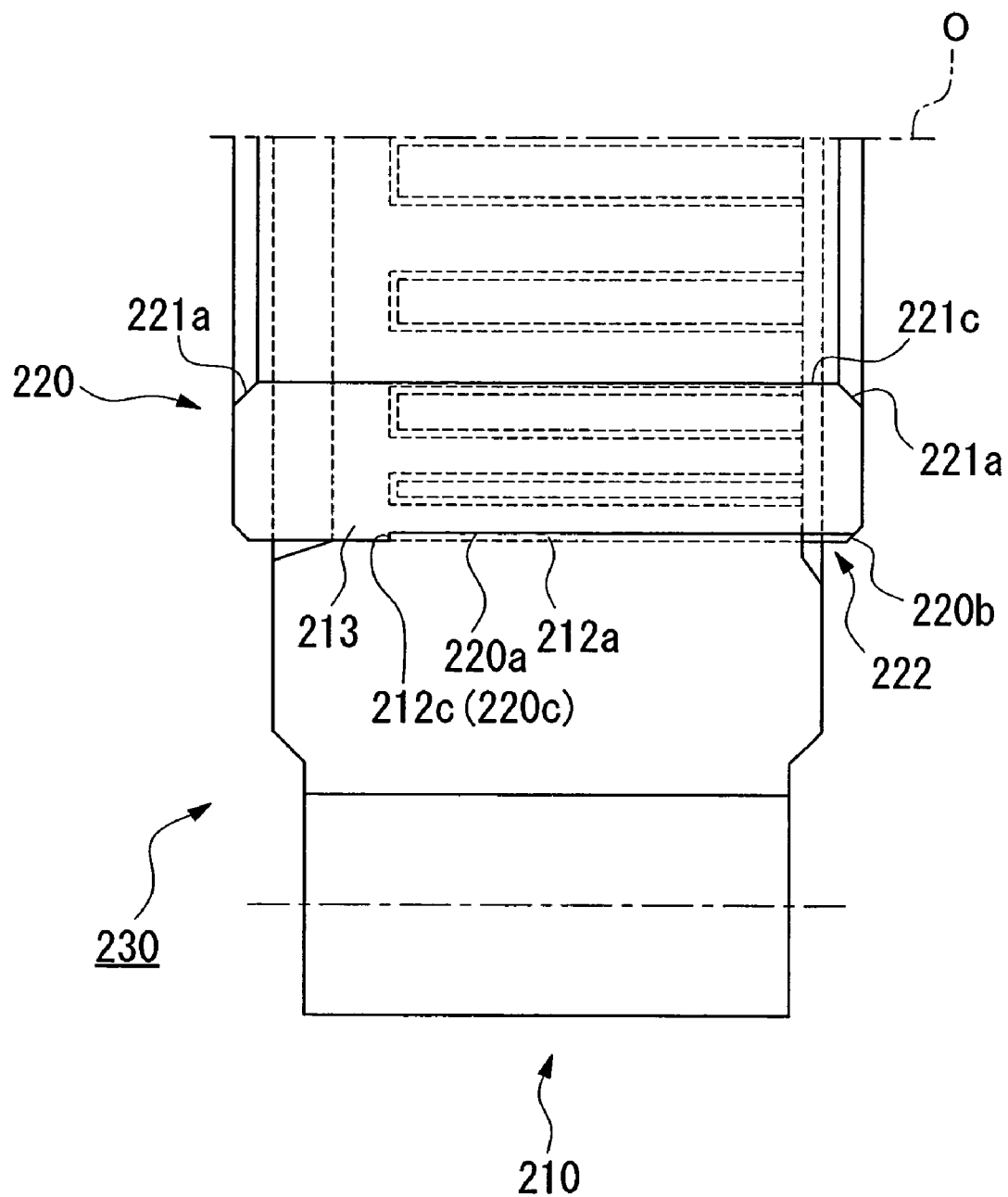
FIG. 12 is a half sectional view showing a state in which the bearing member is fitted by pressure insertion into a press-insertion hole of the rotation member shown in FIG. 11.

Firstly, the bearing member 220 is press-inserted in the press-insertion hole 211 of the gear member 210 in the press-insertion direction shown in FIG. 11. Next, as is shown in FIG. 12, the bearing member 220 is made to protrude from the press-insertion hole 211 on the front side in the press-insertion direction (i.e., the right side in the drawing) in which it is inserted in the gear member 210, so as to provide a protruding portion 222.

Figure 13:
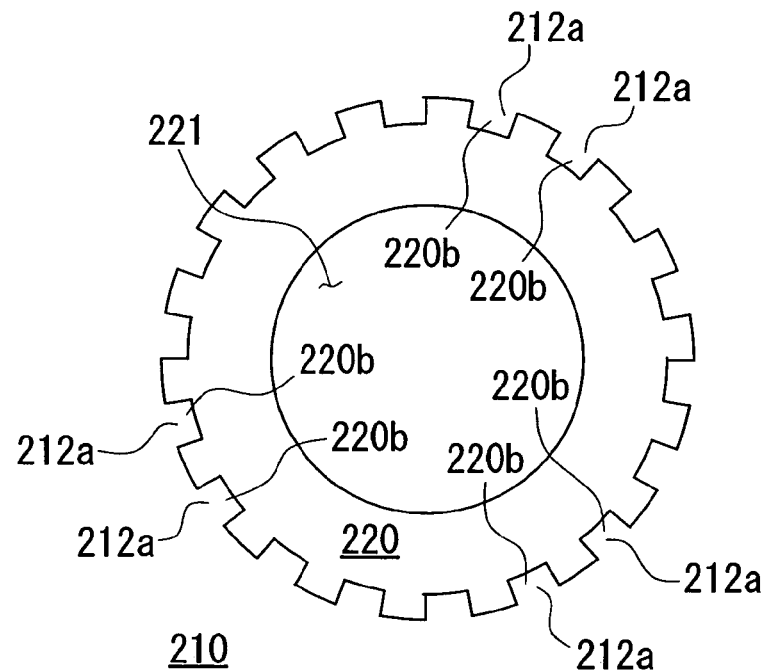
FIG. 13 is a schematic view showing an engaged state in the radial direction of the rotation member and bearing member shown in FIG. 12.

By press-inserting the bearing member 220 in the press-insertion hole 211, meshing portions 220b are formed by the convex bars 212a on the outer circumferential surface 220a of the bearing member 220. As is shown in FIG. 12 and FIG. 13, the gear member 210 and the bearing member 220 are fitted together by the meshing configuration created by the respective convex bars 212a and the meshing portions 220b, and end surfaces 212c on the rear side in the press-insertion direction of the convex bars 212a are placed in a state of abutting against end surfaces 220c on the rear side in the press-insertion direction of the meshing portions 220b of the bearing member 220. Note that the deformation of the bearing member 220 that forms the meshing portions 220b may be either a plastic deformation or an elastic deformation.

Figure 14:
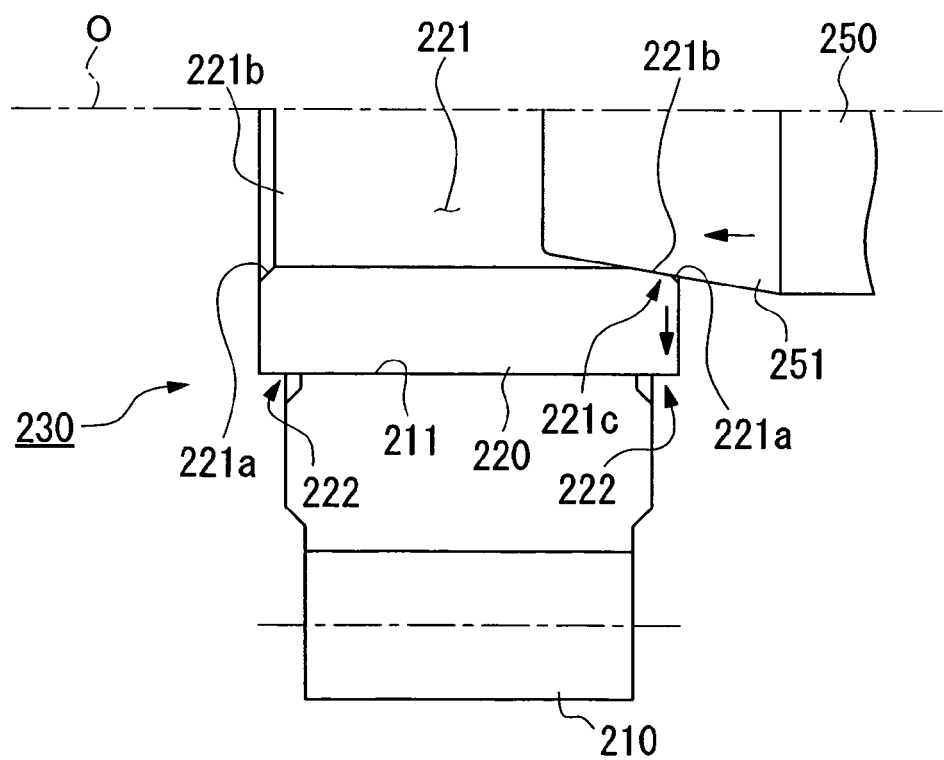
FIG. 14 is a schematic view showing a diameter enlarging step in a third embodiment of the present invention.

Next, a diameter enlarging step shown in FIG. 14 is performed using a diameter enlarging tool 250, and the gear member 210 and the bearing member 220 are fixed to each other.

The diameter enlarging tool 250 has a conical surface 251 that forms a more acute angle relative to the axis O than the chamfer angle (here, 45°) formed by the first chamfered portion 221a that has been formed in the center hole 221 of the bearing member 220 relative to the axis O.

As is shown in FIG. 14, in the diameter enlarging step, by pushing the diameter enlarging tool 250 in a direction heading from the front in the press-insertion direction towards the rear (i.e., from the right to left in the drawing) into the center hole 221 of the bearing portion 220 that has been press-inserted into the press-insertion hole 211, a inner circumferential surface 221c of the center hole 221 is gradually widened in diameter in a direction heading from the inner side of the first chamfered portion 221a towards the center in the axial direction by the conical surface 251 of the tool 250, and is plastically deformed.

Figure 15:
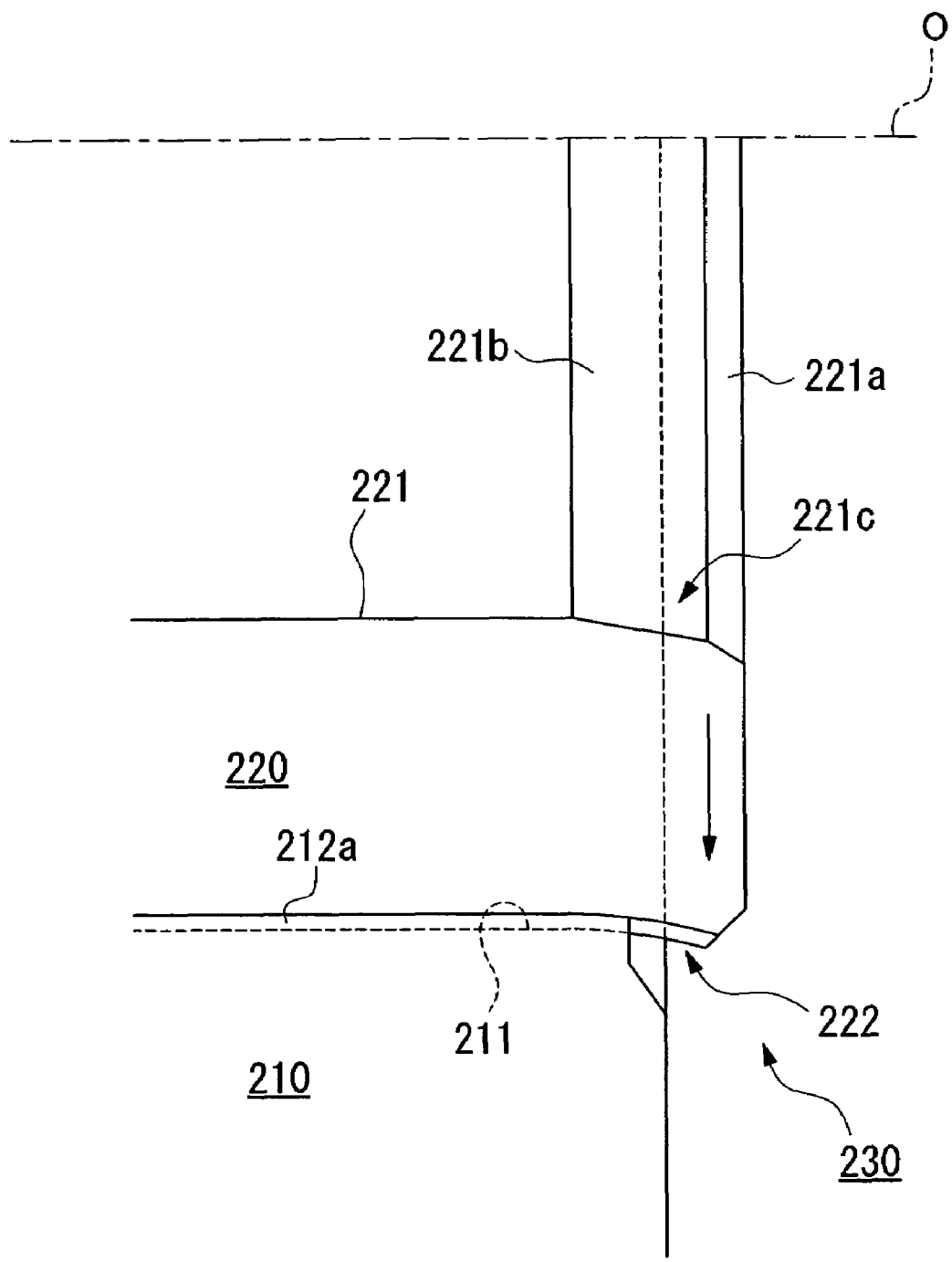
FIG. 15 is an enlarged view showing principal portions of a bearing member that is formed by a diameter enlarging step, and in which a second chamfer portion is formed.

As a result of this diameter enlarging step, as is shown in FIG. 15, a second chamfered portion 221b whose chamfer angle relative to the axis O is different from that of the first chamfered portion 221a is formed in the bearing member 220. At the same time, the protruding portions 222 whose outer circumferential surface is not restricted by the press-insertion hole 211 is plastically deformed such that the outer diameter thereof is bigger than the inner diameter of the press-insertion hole 211.

By assembling the gear member 210 and the bearing member 220 and performing the diameter enlarging step in this manner, not only is any rotation restricted by the convex bars 212a and the meshing portions 220b, but movement to the front in the press-insertion direction of the bearing member 220 is restricted by the convex bars 212a and the end surfaces 212c. In order to move the bearing member 220 from this state to the right in the axial direction relative to the gear member 210, a huge force is required that can overcome the force that is needed by the end surfaces 212c of the convex bars 212a to cut into the outer circumferential surface 220a of the bearing member 220.

Furthermore, movement of the bearing member 220 to the rear in the press-insertion direction is restricted by the protruding portions 222 having enlarged diameters, so that a planetary gear 230 that does not cause displacement in the rotation direction and in the axial direction can be manufactured.

Note that, in the drawings, the shape of the meshing formed by the convex bars 212a and the meshing portions 220b has been enlarged and shown in a magnified size in order to simplify the description, however, even if the difference between the top and bottom of the meshing configuration is approximately 0.5 to 10 μm, as mentioned above, it is possible to obtain a sufficient effect of preventing displacement in the rotation direction and the axial direction.

Next, a fourth embodiment of the present invention will be described with reference made to FIGS. 16 and 17.

Figure 16:
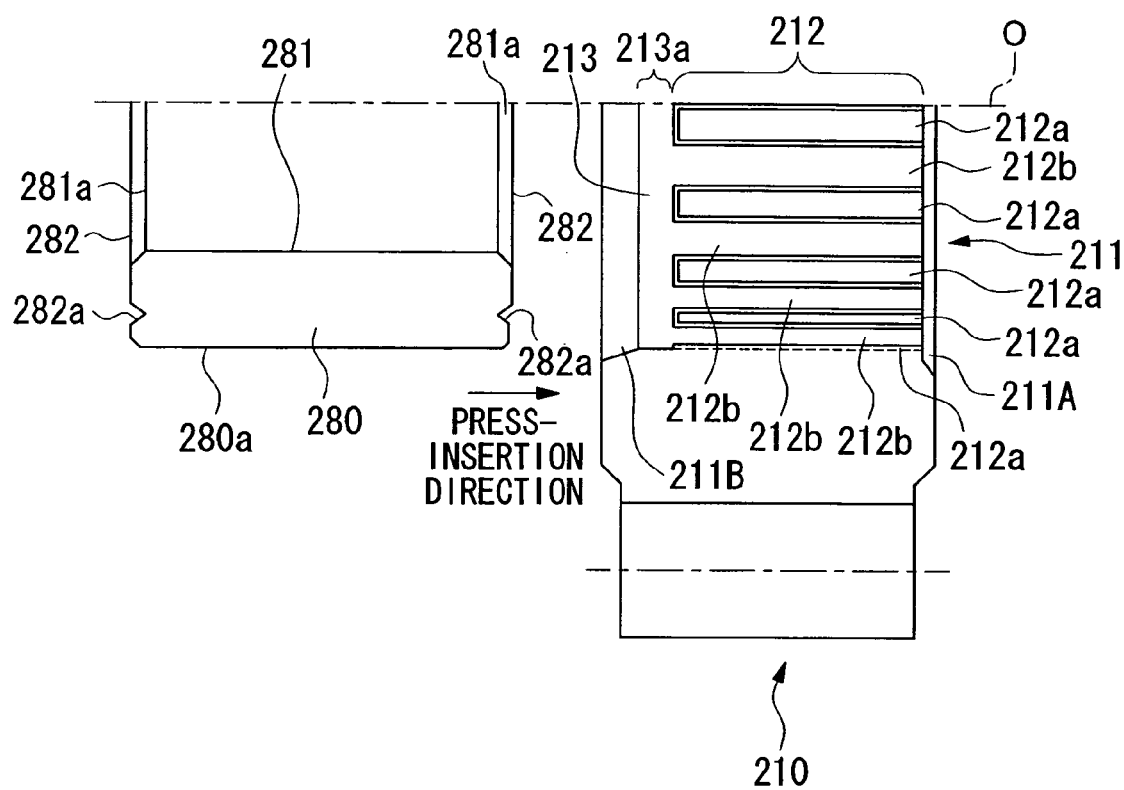
FIG. 16 is a half sectional view showing a rotation member that forms a rotation transmission member according to a fourth embodiment of the present invention, and a bearing member that fits together with this rotation member.

FIG. 16 is a cross-sectional view showing a gear member 210 (i.e., a rotation member) that constitutes a rotation transmission assembly 260 of the present embodiment, and a bearing member (i.e., an inner side member) 280, that is fixed to the gear member 210. The gear member 210 is identical to the gear member 210 of the third embodiment. Because the rotation transmission assembly 260 of the present embodiment is also a planetary gear of a planetary gear mechanism (i.e., a gear mechanism) 240, such as that shown in FIG. 18, which is used in a deceleration mechanism or the like, in the same way as in the third embodiment, and the rotation transmission assembly 260 is used by inserting a shaft thereof on an inner side of the bearing member 280, the gear member 210 is preferably formed from a high strength material suitable for a gear, and the bearing member 280 is preferably formed from a material that has good slidability relative to the shaft. In addition, in the same way as in the third embodiment, the gear member 210 and the bearing member 280 are able to be produced in large quantities at low cost by powder molding and sintering.

As is described above, because the gear member 210 is identical to the gear member 210 of the third embodiment, a detailed description thereof is here omitted.

As is shown in FIG. 16, the bearing member 280 that is press-inserted into the press-insertion hole 211 of the gear member 210 is formed in a circular cylinder shape and has an outer circumferential surface 280a that is formed slightly larger than the press-insertion surfaces 213 and 212b of the press-insertion hole 211, and a center hole 281 that is formed in the direction of the axis O. A slot portion 282a having a triangular cross section is provided in an end surface 282 of the bearing member 280.

The bearing member 280 is press-inserted into the press-insertion hole 211 of the gear member 210 in the direction shown in FIG. 16. The bearing member 280 is then made to protrude from the press-insertion hole 211 on the front side (i.e., the right side in the drawing) in the press-insertion direction in which it is inserted in the gear member 210, so as to provide a protruding portion 283.

In this manner, in a state in which the bearing member 280 is press-inserted into the press-insertion hole 211, in the same way as in the third embodiment shown in FIG. 12 and FIG. 13, in order to move the bearing member 280 from this state to the right in the axial direction (i.e., the press-insertion direction) relative to the gear member 210, a huge force is required that can overcome the press-insertion force.

Figure 17:
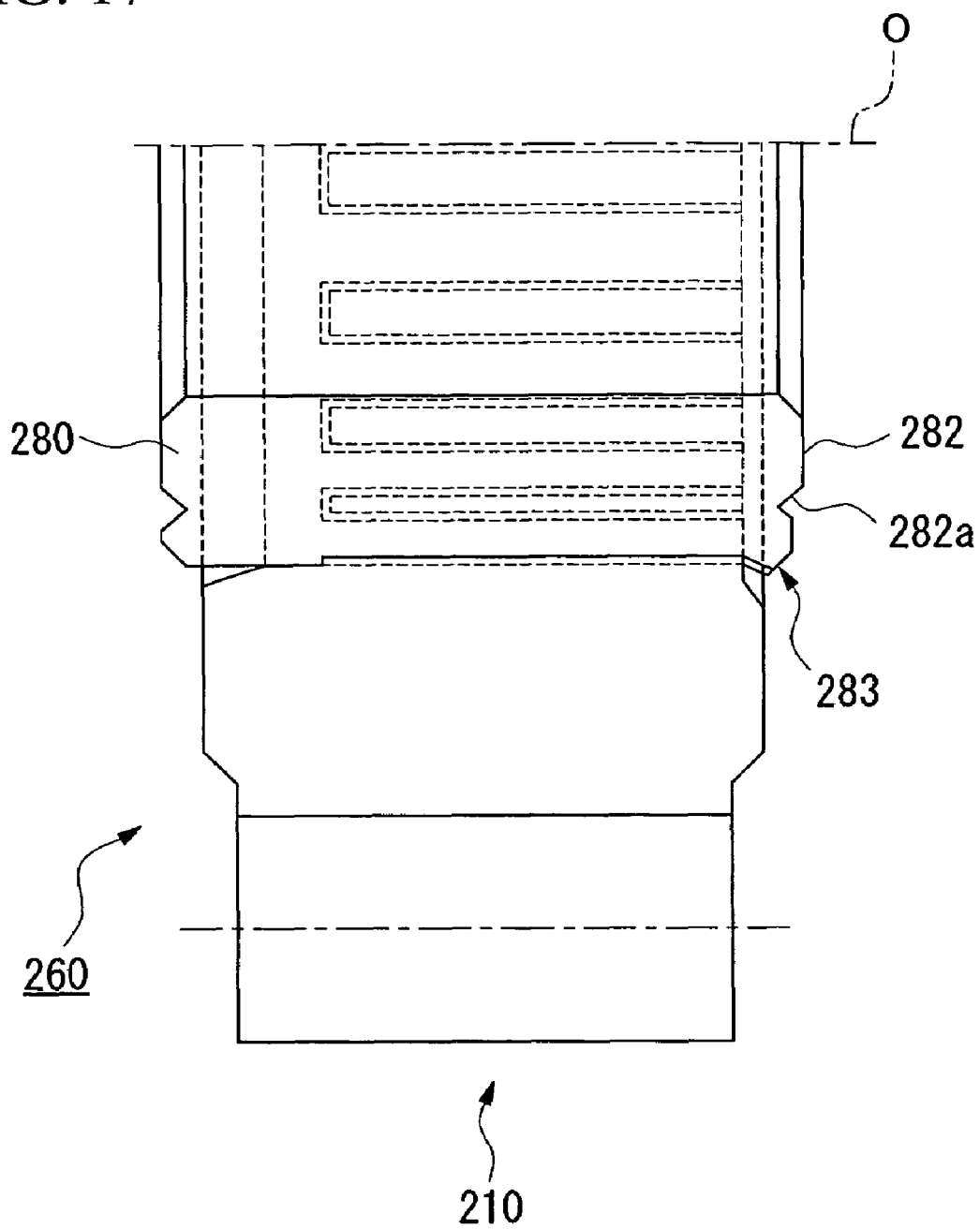
FIG. 17 is a cross-sectional view showing a rotation member and a bearing member in a state of being fixed together by pressure insertion.

Next, a diameter enlarging step is performed so that, as is shown in FIG. 17, the bearing member 280 is made to adhere tightly to the end portion of the press-insertion hole 211 of the gear member 210, thereby fixing the two members together in the axial direction. Namely, in a state in which the gear member 210 and the bearing member 280 are held fixed such that they cannot move relative to each other, by driving, for example, a wedge shaped tool into the slot portion 282a on the protruding portion 283 side in a direction towards the rear in the press-insertion direction (i.e., to the left in the drawing), the outer circumferential side of the slot portion 282a is deformed towards the outer side in the radial direction. As a result, because the outer diameter of the protruding portion 283 is made larger than the inner diameter of the press-insertion hole 211, movement of the bearing member 280 to the rear of the direction in which the bearing member 280 is press-inserted into the gear member 210 is restricted. A step such as this of applying elastic deformation to the members so as to cause the members to tightly adhere together is also referred to as caulking.

By assembling the gear member 210 and the bearing member 280 and performing the diameter enlarging step in this manner, a rotation restriction is set by the convex bars 212a and the meshing portions, a restriction is set on forward movement in the press-insertion direction of the bearing member 280 by the end surface and end portion of the convex bars 212a, and a restriction is set on rearward movement in the press-insertion direction of the bearing member 280 by the enlarged diameter protruding portion 283, and it is consequently possible to manufacture the planetary gear 260 that does not cause displacement in the rotation direction and in the axial direction.

Figure 18:
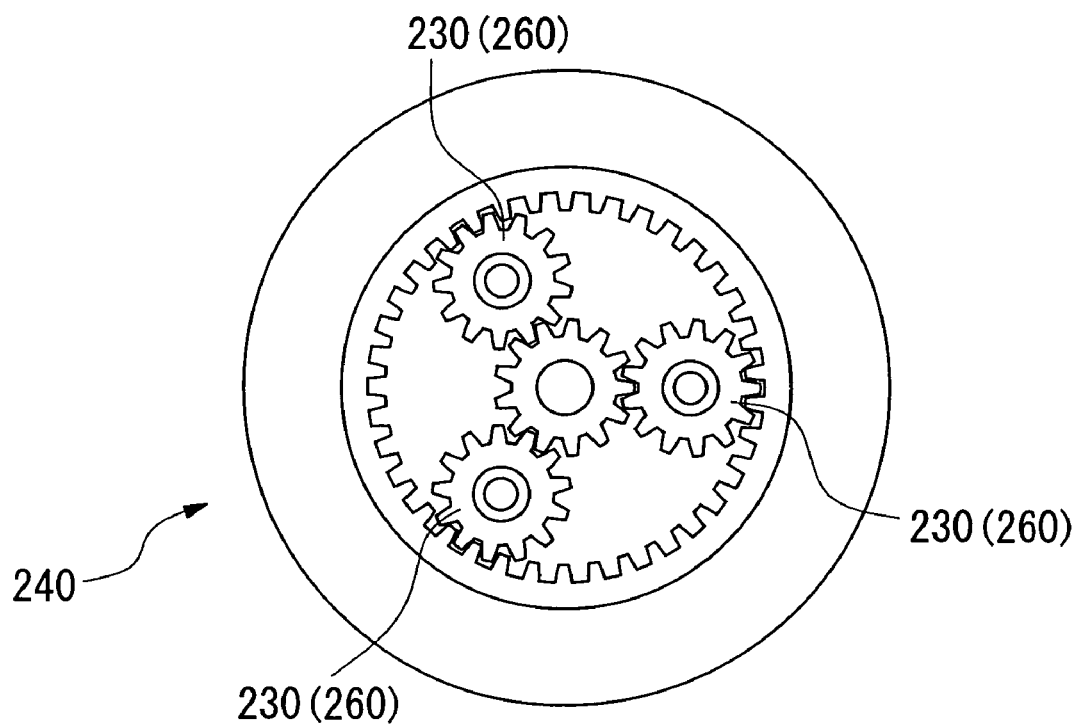
FIG. 18 is a view showing a planetary gear mechanism of the present invention.

As is shown in FIG. 18, a rotation transmission assembly 230 (260) of the present embodiment is a planetary gear of a planetary gear mechanism (i.e., a gear mechanism) 240, which is used in a deceleration mechanism or the like.

Note that the variety of configurations and combinations and the like of the respective component elements described in the above embodiments are single examples thereof, and various modifications are possible based on the design requirements provided that they do not depart from the purpose of the present invention.

For example, in the above described third embodiment, the convex bars 212a are formed as far as a point partway along in the axial direction of the press-insertion hole 211, however, they may also be formed extending for the entire length in the axial direction. In this case, by leaving the bearing member also protruding to the rear in the press-insertion direction, the end surfaces located at the rear of the convex bars in the press-insertion direction and the rear end surfaces of the meshing portions that are formed on the outer circumferential surface of the bearing member abut against each other. As a result, it is possible to prevent the bearing member from becoming displaced to the front relative to the rotation member.

Furthermore, in the above described fourth embodiment, as is shown in FIG. 17, only the outer circumferential side of the right hand side slot portion 282a is deformed outwards in the radial direction, however, it is possible for the outer circumferential side of the V-shaped slot portion 282a that is provided on the left hand side of the bearing member 280 to also be deformed outwards in the radial direction. By employing a structure such as this, it is possible to further increase the anti-release function towards the front in the press-insertion direction. Moreover, as is shown in FIG. 17, if only the outer circumferential side of the right hand side slot portion 282a is deformed outwards in the radial direction, the left hand side slot portion 282a can be omitted.

In the above description, the rotation transmission member is taken as a gear that is in direct contact with a similar rotation transmission member so as to transmit a rotation force, however, the present invention is not limited to this, and may also be applied to a slotted pulley that transmits a rotation force via a belt, and to a sprocket that transmits a rotation force via a chain, and the like.

INDUSTRIAL APPLICABILITY

As has been described above, according to the present invention, simply by press-inserting an inner side member (i.e., a bearing member or the like) in a through hole (i.e., a press-insertion hole) of a rotation transmission member (i.e., a gear or the like), it is possible to easily manufacture a rotation transmission assembly (i.e., a planetary gear or the like) that has no tilting of the shaft and that enables rotational displacement and displacement in the axial direction to be prevented, and to provide at low cost a gear mechanism that is mechanically efficient and has little noise and abnormal wear.

Namely, the present invention is characterized in that it makes a compact engagement between an inner side member (i.e., a bearing member and the like) and a rotation transmission member (i.e., a gear or the like) possible and, in particular, if used in a planetary gear, makes a considerable contribution to a reduction in the size of the planetary gear mechanism.

The invention claimed is:

1. A rotation transmission assembly comprising:

a rotation transmission member formed in a substantially circular plate configuration, in a center of which there is a substantially circular cylinder shaped through hole that is formed by an inner circumferential surface, and that comprises a rotation transmission portion located on an outer circumferential portion of the rotation transmission member; and an inner side member that is press-inserted into the through hole and is a sintered component that is manufactured by powder molding and sintering, wherein the inner circumferential surface of the rotation transmission member is provided with:

a smooth ring-shaped surface that is placed adjacent to one end of the inner circumferential surface; and a plurality of protrusion shaped portions that, taking the ring-shaped surface as a basis, protrude inwards in the radial direction, and extend along a portion of the length in the axial direction of the through hole, wherein the inner side member and the rotation transmission member mesh with each other within the range in which the protrusion shaped portions extend, and are in surface contact with each other within a range in which the ring-shaped surface extends wherein the height of the protrusion shaped portions from the ring-shaped surface is 0.5 to 10 μm, and wherein front end surfaces in a press-insertion direction of the protrusion shaped portions incline toward the rear in the press-insertion direction from the inner circumferential surface to top ends of the protrusion shaped portions wherein the inner side member before press-insertion has a cylindrical circumference and the sintered material is deformable to enable that the inner side member to compress and be cut by the protrusion shaped portion when the inner side member and the rotation transmission member are meshed.

2. A rotation transmission assembly according to claim 1, wherein the protrusion shaped portions are a plurality of convex bars that extend rectilinearly from one end of the ring-shaped surface to an end portion of the through hole.

3. A rotation transmission assembly according to claim 2, wherein the plurality of convex bars are placed equally in the circumferential direction of the inner circumferential surface.

4. A rotation transmission assembly according to claim 1, wherein the rotation transmission member is formed as a gear that has a plurality of teeth on the rotation transmission portion, and the inner side member is formed as a cylindrical bearing member.

5. A gear mechanism that is provided with the rotation transmission assembly described in claim 4.

* * * * *